US 7,852,823 B2

(12) United States Patent
Nakashima et al.

(10) Patent No.: US 7,852,823 B2
(45) Date of Patent: Dec. 14, 2010

(54) COMMUNICATION MANAGEMENT METHOD, COMMUNICATION TERMINAL, COMMUNICATION MANAGEMENT PROGRAM, RECORDING MEDIUM CONTAINING THE COMMUNICATION MANAGEMENT PROGRAM, AND COMMUNICATION SYSTEM

(75) Inventors: Ken Nakashima, Tenri (JP); Yoshihiro Ohtani, Kyoto (JP); Toru Ueda, Kyoto (JP); Srinivas Kandala, Camas, WA (US)

(73) Assignee: Sharp Kabushiki Kaisha, Osaka-shi (JP)

( * ) Notice: Subject to any disclaimer, the term of this patent is extended or adjusted under 35 U.S.C. 154(b) by 1296 days.

(21) Appl. No.: 10/489,731

(22) PCT Filed: Sep. 12, 2002

(86) PCT No.: PCT/JP02/09378

§ 371 (c)(1),
(2), (4) Date: Mar. 16, 2004

(87) PCT Pub. No.: WO03/026215

PCT Pub. Date: Mar. 27, 2003

(65) Prior Publication Data

US 2004/0233876 A1 Nov. 25, 2004

(30) Foreign Application Priority Data

Sep. 17, 2001 (JP) .............................. 2001-282074

(51) Int. Cl.
*H04B 7/212* (2006.01)
(52) U.S. Cl. ...................... 370/348; 370/338; 370/450; 370/443; 455/452.1

(58) Field of Classification Search ................. 370/338, 370/348, 450, 442–443; 455/452.1; 709/204–207, 709/238–244
See application file for complete search history.

(56) References Cited

U.S. PATENT DOCUMENTS 5,594,776 A * 1/1997 Dent .......................... 455/458

(Continued)

FOREIGN PATENT DOCUMENTS

JP 2-78343 A 3/1990

(Continued)

OTHER PUBLICATIONS

"Draft Supplement to STANDARD FOR Telecommunications and Information Exchange Between Systems-LAN/MAN Specific Requirements- " IEEE Std 802.11e/D1, 2001 pp. 15-17, 25-29 and 44-46.

(Continued)

*Primary Examiner*—George Eng
*Assistant Examiner*—Marcos L Torres
(74) *Attorney, Agent, or Firm*—Birch Stewart Kolasch & Birch, LLP

(57) ABSTRACT

When a transmission station having a voluntary transmission right transmits FINALL FRAME as a TXOP ending frame to HC, the HC transmits an acknowledgement frame ACK after SIFS following the reception of FINAL FRAME. Here, when the transmitting station has detected that no frame transmission is performed over the communication network from any other ESTAs in PIFS after the transmission of FINAL FRAME, FINAL FRAME is retransmitted in DIFS after the transmission of FINAL FRAME. By performing such a communication management, it is possible to accurately manage a voluntary transmission right even when the communication medium has a low reliability in a network in which one network pathway is time-shared by a plurality of communication apparatuses.

42 Claims, 12 Drawing Sheets

U.S. PATENT DOCUMENTS

| | | | |
|---|---|---|---|
| 6,034,966 A * | 3/2000 | Ota | 370/443 |
| 7,145,915 B1 * | 12/2006 | Nyu | 370/450 |
| 2005/0175006 A1 * | 8/2005 | Miyazaki et al. | 370/389 |

FOREIGN PATENT DOCUMENTS

| | | |
|---|---|---|
| JP | 6-85815 A | 3/1994 |
| JP | 7-38581 A | 2/1995 |
| JP | 7-312598 A | 11/1995 |
| JP | 7-312602 A | 11/1995 |
| JP | 09-172446 A | 6/1997 |
| JP | 63-197142 A | 8/1998 |
| JP | 11-298975 A | 10/1999 |

OTHER PUBLICATIONS

S. Kandala et al., "CFB Ending Rule under HCF," IEEE 802.11-01/605r2, Nov. 2001, slides 1-12.

S. Kandala et al., "Normative Text for TXOP Ending rule," IEEE 802.11-01/605r1, Nov. 2001, Slides 1-2.

* cited by examiner

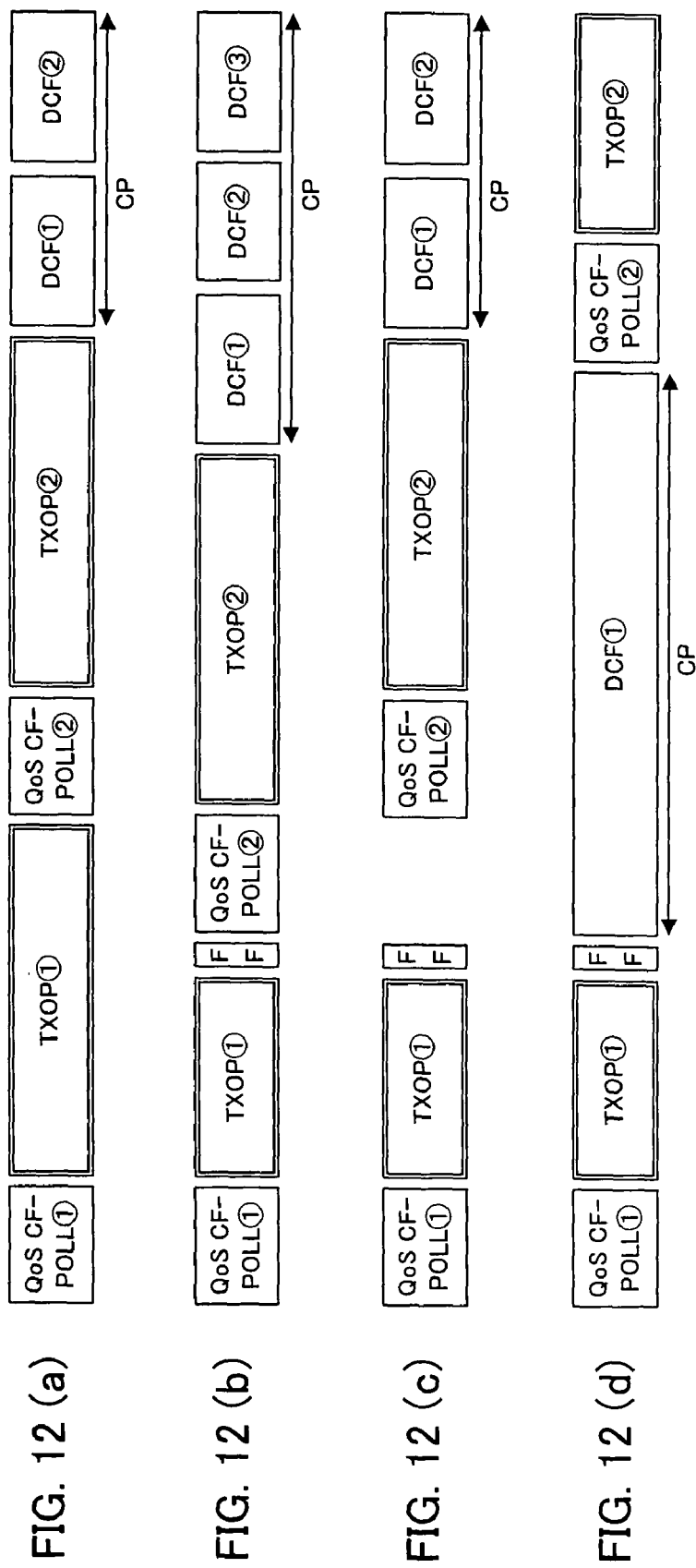

COMMUNICATION MANAGEMENT METHOD, COMMUNICATION TERMINAL, COMMUNICATION MANAGEMENT PROGRAM, RECORDING MEDIUM CONTAINING THE COMMUNICATION MANAGEMENT PROGRAM, AND COMMUNICATION SYSTEM

TECHNICAL FIELD

The present invention relates to a communication management method in a network in which one network pathway is time-shared by a plurality of communication apparatuses, and especially relates to the IEEE 802.11 wireless communication standards.

RELATED ART

Conventionally, in a computer network and the like, frame transmission and reception are performed in accordance with a communication system called "packet communication system". Nowadays, there is increasing demand for construction of a wireless network in home-use LAN (Local Area Network), for example. Such a wireless LAN, as compared to a wired LAN, has the advantages of eliminating the need for wiring such as cabling and increasing mobility of a device connected to the LAN.

In a network including such a wireless LAN, a plurality of communication apparatuses connected to the network share by time one network pathway for frame transmission and reception. In such a system, efficiency of bandwidth use changes significantly depending on a management method for a transmission right.

For example, it is considered that a scheme for bandwidth management of a network pathway called "HCF" (Hybrid Coordination Function in compliance with the IEEE Std 802.11e/D1.2, July 2001) is added to the specifications of the IEEE 802.11 wireless LAN communication standards (in compliance with ANSI/IEEE Std. 802.11, 1999 Edition).

In the HCF, it is assumed that a central management device called HC (Hybrid Coordinator) manages transmission rights of all communication apparatuses belonging to a network. Here, among the communication apparatuses belonging to the network, a communication apparatus other than the HC is referred to as ESTA (Enhanced Station).

The HCF is a scheme developed for transmission of real-time data such as video data. In this HCF, each ESTA reports to the HC information on properties of data to be transmitted from itself. As used herein, "information on properties of data" refers to information on how much volume of data is to be transmitted at what time intervals. The HC having received such information from the ESTAs schedules the order of granting a voluntary transmission right and a grant duration of the voluntary transmission right so as to meet the requests from the ESTAs, and the voluntary transmission right is granted to each of the ESTAs in accordance with this schedule.

The HC grants the voluntary transmission right with time limit called "TXOP" (Transmission Opportunity) to the ESTA. Then, in order to notify the grant, the HC transmits a frame called "QoS CF-POLL" to the ESTA which the HC will granted the voluntary transmission right to. QoS CF-POLL includes information on grant duration of the voluntary transmission right, which is called "TXOP LIMIT." The ESTA to which QoS CF-POLL is addressed is allowed to transmit data during this duration. Hereinafter, an ESTA having been granted the TXOP is called "TXOP holder".

Each of the ESTAs has a value, called "NAV" (Network Allocation Vector), to manage whether the ESTA itself is granted the voluntary transmission right. When the NAV value is more than 0, the ESTA is only allowed to make a response to a frame transmitted from another ESTA (for example, upon reception of data frame, to return a transmission acknowledgement frame) and is set not to initiate data transmission from itself.

An ESTA to which QoS CF-POLL is not addressed, when receiving QoS CF-POLL, sets a value indicated by TXOP LIMIT to NAV. The NAV value decreases with the passage of time, and when the NAV value decreases to 0, the ESTA recognizes that it has been allowed a transmission, and attempts a data transmission from itself by a scheme called "DCF (Distributed Coordination Function).

In the DCF, when a wireless medium is detected idle for a period called "DIFS" (Distributed Coordination Function Inter Frame Space), each of the ESTAs initiates a count-down timer called backoff timer. This backoff timer is a count-down timer that the ESTA starts from a random value in a predetermined range. If the wireless medium is idle when the backoff timer becomes zero, the ESTA obtains the voluntary transmission right and initiates data transmission. That is, the ESTA which can set the backoff timer to a small value by a random number obtains the voluntary transmission right, so that the DCF substantially allows the ESTAs attempting to obtain the voluntary transmission right to be equally granted the voluntary transmission right.

As described above, the HCF provides a period during which the ESTA is granted the TXOP by the HC, and a CP (Contention Period) during which the voluntary transmission right is obtained by the above DCF. For example, if no CP is provided, the ESTA attempting the transmission of normal data, i.e. lower priority data is difficult to be granted the TXOP. Therefore, provision of the CP, as described above, increases the opportunity of securing the voluntary transmission right for the ESTA which transmits lower priority data. The amount of time the CP is to be provided is set as appropriate by the HC, depending on properties of data required by the ESTAs.

Here, the following will specifically describe management of the TXOP. As described above, QoS CF-POLL which is transmitted to the ESTA that is to be granted the voluntary transmission right by the HC indicates TXOP LIMIT, which is a duration period of the granted TXOP. That is, an ESTA granted the TXOP, that is, a TXOP holder is not allowed to transmit beyond the TXOP LIMIT given. Conversely, the TXOP holder can freely transmit data frame until the TXOP LIMIT reaches 0.

Further, data frame transmitted during the TXOP is successively transmitted at an interval of SIFS (Short Inter Frame Space), which is shorter than the DIFS. Note that, the SIFS corresponds to a minimum frame space in the IEEE 802.11 standards. When acknowledgement needs to be transmitted in response to a transmitted data frame from a receiving end, upon the reception of a data frame, a receiving station transmits an acknowledgement frame after the SIFS.

The TXOP holder basically continues data transmission during the TXOP duration. However, it is conceivable that during the TXOP duration, that is, before the given TXOP LIMIT reaches zero, the TXOP holder has run out of data frame to be transmitted. In this case, the TXOP holder transmits a frame called "TXOP ending frame" to the receiving station or the HC after the SIFS following the transmission of the last data frame. When receiving the TXOP ending frame, the HC recognizes that the TXOP granted to the ESTA, a transmitting end of the TXOP ending frame, has been returned to the HC, and initiates the subsequent sequence, for example, of transmitting QoS CF-POLL to grant the voluntary transmission right to another ESTA.

The ESTA other than the TXOP holder is set to reset its NAV value to zero when receiving the TXOP ending frame so that they can initiate the DCF immediately after the end of the TXOP. This allows the ESTA other than the TXOP holder to attempt to obtain the voluntary transmission under the DCF immediately after the transmission of the TXOP ending frame.

Incidentally, in a wireless communication network, a communication medium has a relatively low reliability, and there is a relatively high probability that the receiving end would fail to correctly receive a transmitted data frame. When such a transmission failure occurs, there is the possibility that a transmission sequence unexpected by the HC is performed, instead of a transmission according to the schedule coordinated by the HC, and management of the voluntary transmission right is not ensured.

Here, as one example, a schedule coordinated by the HC assumes that TXOP① is granted to a first ESTA, and TXOP② is then granted to a second ESTA, and thereafter, the CP of a predetermined period is provided. In this case, when a transmission is performed according to the schedule coordinated by the HC, a sequence as shown in FIG. 12(*a*) is performed.

That is, to begin with, the HC transmits QoS CF-POLL① to the first ESTA. In response to this, the first ESTA transmits data frames during the TXOP①. After the end of the TXOP①, the HC transmits QoS CF-POLL② to the second ESTA. In response to this, the second ESTA transmits data frames during the TXOP②. After the end of the TXOP②, the CP is started, other ESTA obtains the voluntary transmission right under the DCF, and DCF① and DCF② are performed during the CP.

Here, in the case where the first ESTA transmits TXOP ending frame before a given TXOP LIMIT reaches zero, a sequence as shown in FIG. 12(*b*) may be performed.

That is, upon reception of the TXOP ending frame FF transmitted from the first ESTA, the HC recognizes that the first ESTA has abandoned the TXOP①. Then, for grant of the TXOP② to the second ESTA, which is the subsequent work, the HC transmits the QoS CF-POLL② to the second ESTA. The second ESTA transmits data using the TXOP② which is a period as scheduled. In this case, since the TXOP② is granted earlier than it is intended, the CP can be set longer, and the ESTA which transmits under the DCF can receive the benefit of enabling transmission of many sets of data.

In this case, the following problem would occur. Basically, the TXOP ending frame transmitted by the TXOP holder is received by the HC. However, it is considered that the HC fails to receive the TXOP ending frame for some reason. In this case, the TXOP holder recognizes that the return of a voluntary transmission right has been completed, whereas the HC recognizes that the voluntary transmission right has not been returned.

Since the TXOP holder judges that it does not have the voluntary transmission right, the TXOP holder does not initiate transmission of a data frame until the TXOP holder is newly granted the TXOP or obtains the voluntary transmission right under the DCF. On the other hand, since the HC judges that the TXOP holder is granted the voluntary transmission right until the expiry of the TXOP duration given to the TXOP holder, the HC cannot transfer to another sequence such as transmitting QoS CF-POLL to grant the TXOP to another ESTA. That is, as shown in FIG. 12(*c*), a communication medium is in the idle state during a period of time from the transmission of the TXOP ending frame FF by the first ESTA to the transmission of the QoS CF-POLL②, which decreases the efficiency of bandwidth use. The HCF has been developed for the transmission of realtime data such as video data, and as many sets of data as possible need to be transmitted as quickly as possible, so that such a wasted use of communication bandwidth must be avoided.

Furthermore, in the specifications of the current IEEE 802.11e, the ESTA other than the TXOP holder is set to reset its NAV value when receiving the TXOP ending frame. Therefore, in the above example, when a period of time in which no signals are sent out from any communication apparatuses after the transmission of the TXOP ending frame by the first ESTA lasts for longer than the DIFS, the ESTA other than the TXOP holder attempts to obtain a voluntary transmission right under the DCF. Therefore, depending on the circumstances, it is considered that an ESTA which is unexpected by the HC in scheduling would obtain the voluntary transmission right.

FIG. 12(*d*) shows a case where after the first ESTA transmits the TXOP ending frame FF, the HC fails to receive this TXOP ending frame FF, and immediately afterward, another ESTA obtains the voluntary transmission under the DCF. In this case, transmission under the DCF①, which is not intended in scheduling coordinated by the HC, is performed, and the transmission of QoS CF-POLL② is performed after the transmission of the DCF①, that is, with an appreciable delay of the schedule.

Here, in order to let the ESTAs to transmit lower priority data and data which are not needed to be transmitted regularly, the HC must prepare a given period for the CP in advance. If the DCF① unexpected by the HC is longer than the prepared CP, as a result, the duration of the TXOP② is set to be shorter than it is intended. That is, the second ESTA which is granted the TXOP② is not given the voluntary transmission right of a requested condition, which disables a scheduled data transmission. Therefore, there is the possibility that when the second ESTA transmits realtime data, a trouble including a distorted image would occur at a receiving station of the realtime data.

As to transmission and reception of QoS CF-POLL, the problem as described above also occurs. That is, when the QoS CF-POLL is correctly received by an ESTA as a destination of QoS CF-POLL, the ESTA as a destination of the QoS CF-POLL recognizes that the TXOP has been granted to itself and initiates data transmission, so that a wireless signal is sent out after the SIFS. However, when the QoS CF-POLL is not correctly received by the ESTA as a destination of the QoS CF-POLL, the ESTA as a destination of the QoS CF-POLL is not supposed to send out a wireless signal.

In this case, on the assumption that interruption and transmission by an ESTA to which QoS CF-POLL is not addressed does not happen, when the HC detects that no wireless signals are sent out from any ESTAs in the PIFS period after the transmission of the QoS CF-POLL and when, the HC judges that QoS CF-POLL frame has not been correctly received by the ESTA as a destination of the QoS CF-POLL frame and retransmits the QoS CF-POLL frame. This retransmission is repeated until the retransmission reaches a certain condition (including a condition where data transmission has not been initiated even after the QoS CF-POLL frame is retransmitted for a certain number of times).

At this moment, although none of the ESTAs are supposed to send out wireless signals after the SIFS of the transmission of CF-POLL, there is the possibility that the HC detects wireless signals for some reason. In this case, since the QoS CF-POLL is not correctly received by the ESTA, which is the destination of the QoS CF-POLL, the HC mistakenly recognizes that the grant of the TXOP has been completed even though the ESTA, which is the destination of the QoS CF-POLL, does not recognize that the TXOP has been granted.

The possible reasons why the HC mistakenly detects a wireless signal include noise, frame transmission under the DCF by the ESTA which has failed to receive the QoS CF-POLL and has not set the NAV, and frame transmission by the ESTA belonging to another network in the neighborhood.

In such a case, as in the case with the completion of the TXOP, there occurs a period of time during which no data transmission is made from any devices, which wastes communication bandwidth, depending on the circumstances, and causes a problem such as unexpected obtaining of the voluntary transmission right from the HC by the ESTA under DCF.

The present invention is achieved to solve the above problems, and a feature of the present invention is to provide: in a network in which one network pathway is time-shared by a plurality of communication apparatuses, a communication management method which allows an accurate management of a voluntary transmission right even in a communication medium with low reliability; a communication device; a central management device; a communication management program; a recording medium containing the communication management program; and a communication system.

SUMMARY OF THE INVENTION

To solve the problems, a communication management method in accordance with the present invention is a communication management method for a communication system in which a plurality of communication devices are connected via a communication network to a central management device for managing grant of a voluntary transmission right to the plurality of communication devices, and is characterized in that the method includes the step of: one of the communication devices having been granted the voluntary transmission right by the central management device, transmitting a transmission right return frame to the central management device to voluntarily return the voluntary transmission right to the central management device.

Conventionally, in some cases, the transmission right return frame is transmitted not to the central management device, but to a communication device receiving data from another communication device having a voluntary transmission right. In such cases, it is unknown when the transmission right return frame will be transmitted; therefore, after transmitting the transmission right grant frame, the central management device must perform a reception process on all frames including those addressed to devices other than the central management device, in order to determine whether the frames are, for example, transmission right return frames. This requires the central management device to perform a process with a relatively heavy load, which would result in added complexity and cost in materializing the central management device.

In contrast, according to the above method, the transmission right return frame is transmitted to the central management device. Consequently, according to the method, the central management device never misses a transmission right return frame provided that the apparatus performs a reception process on only those frames which are addressed to the apparatus. This reduces the workload of the central management device and reduces the complexity, as well as production and device costs, in materializing the apparatus.

Another communication management method in accordance with the present invention is a communication management method for a communication system in which a plurality of communication devices are connected via a communication network to a central management device for managing grant of a voluntary transmission right to the plurality of communication devices, and is characterized in that the method includes the steps of: the central management device transmitting a transmission right grant frame to one of the communication devices, so as to grant the voluntary transmission right to the communication device; and the central management device transmitting the transmission right grant frame without performing error-correction coding.

A communication device having received a transmission right grant frame may lose the voluntary transmission right to another communication device under DCF, as an example, unless it transmits a frame of some kind in a predetermined period of time after the completion of the reception of the transmission right grant frame. Therefore, the communication device having received the transmission right grant frame needs to determine that the received frame is a transmission right grant frame in a short period of time.

Here, as in the above method, if the transmission right grant frame transmitted from the central management device is not error-correction encoded, the communication device receiving that frame can determine whether the received frame is a transmission right grant frame without decoding the error-correction coded frame. This would enable the communication device to quickly identify a transmission right grant frame after the reception of the frame. Thus, the communication device can initiate a transmission of frames to be transmitted without losing the voluntary transmission right to another communication device.

A communication management method in accordance with the present invention is a communication management method for a communication system in which a plurality of communication devices are connected via a communication network to a central management device for managing grant of a voluntary transmission right to the plurality of communication devices, and is characterized in that the method includes the steps of: the central management device transmitting a transmission right grant frame to one of the communication devices, so as to grant the voluntary transmission right to the communication device; and the communication device having received the transmission right grant frame always returning an acknowledgement frame to the central management device in a predetermined sixth period after the reception of the transmission right grant frame from the central management device.

Conventionally, in some cases, a transmission right grant frame is used which requires no acknowledgement, and the communication device does not return an acknowledgement frame as to the reception of such a frame. In such cases, the central management device transmitting a transmission right grant frame cannot verify an accurate reception of the frame by the destination communication device.

In contrast, according to the above method, the communication device having received a transmission right grant frame always returns an acknowledgement frame to the transmission right grant frame. Therefore, an acknowledgement frame is returned to the central management device having transmitted a transmission right grant frame. This enables the central management device to reliably verify an accurate reception of the transmission right grant frame by the destination communication device. Therefore, for example, when the apparatus has failed to verify an accurate reception of the transmission right grant frame by the destination communication device, the central management device can take an action: for example, a retransmission of the transmission right grant frame. Thus, the voluntary transmission right grant process is more reliably performed.

Additional features, advantages and novel features of the invention will be set forth in part in the description which follows, and in part will become apparent to those skilled in the art upon examination of the following or may be learned by practice of the invention.

BRIEF DESCRIPTION OF DRAWINGS

FIG. 12($a$) through FIG. 12($d$) are timing charts showing an example of data transmission/reception under a conventional HCF.

DETAILED DESCRIPTION

Referring to FIG. 1 through FIG. 11, the following will describe an embodiment of the present invention.

(Communication System Makeup)

Figure 1:
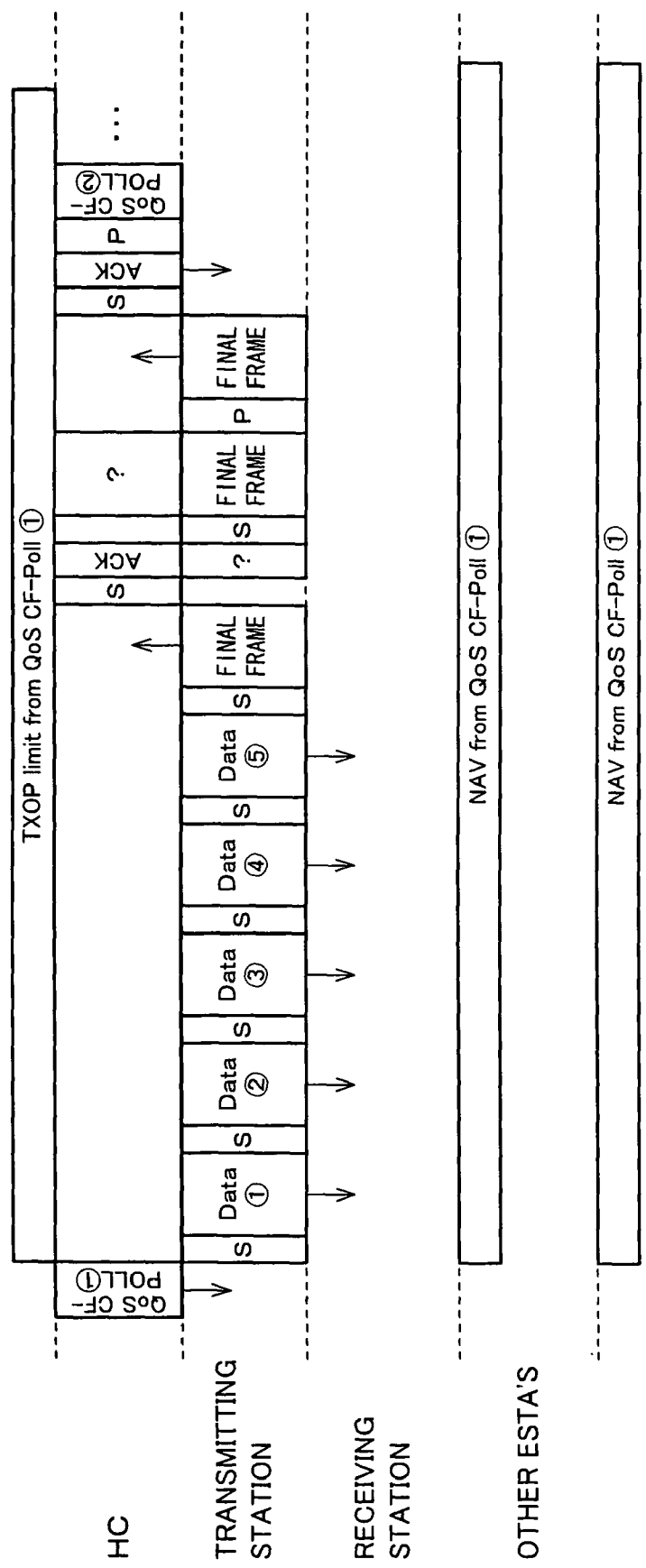
FIG. 1 is a timing chart illustrating a sequence of a TXOP ending process implemented by an HC, data transmitting station, data receiving station, and other ESTAs in a communication system in accordance with an embodiment of the present invention, for cases where a frame is not successfully transmitted/received between the HC and the transmitting station.
Figure 2:
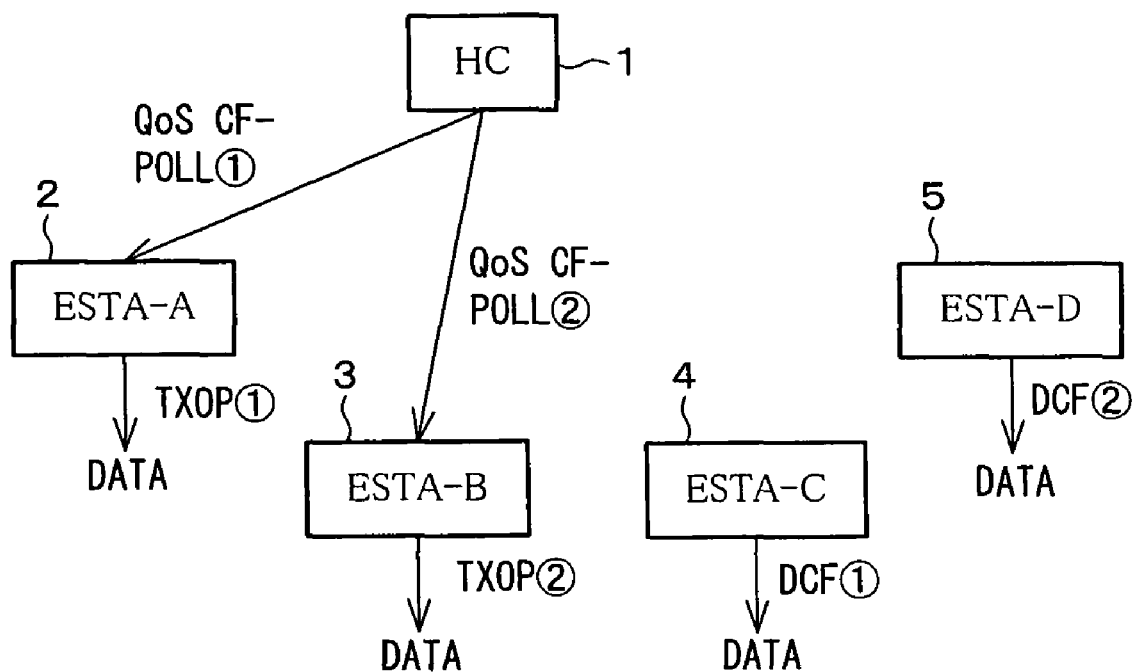
FIG. 2 is an explanatory drawing illustrating, as an example, a structure of a communication system in accordance with the present embodiment.

FIG. 2 is an explanatory drawing illustrating, as an example, a structure of a communication system in accordance with the present embodiment. As shown in the figure, the communication system includes an HC 1 as a central management device and an ESTA-A 2, ESTA-B 3, ESTA-C 4, and ESTA-D 5 as communication devices. All of them are connected via a wireless LAN, which is not illustrated. The communication system may be connected to other communication devices (not illustrated).

The communication system in accordance with the present embodiment may be implemented in various communication systems. Preferable examples include network systems such as a home-use LAN connecting home electric appliances having a built-in wireless communication function. In this particular example, a settop box managing all wireless communication devices in a house would be an equivalent to the HC 1 as a central management device. A DVD player would be an equivalent to the communication device as a data transmitting station. A television set would be an equivalent to the communication device as a data receiving station. The DVD player would send moving images to the television set under the management of the settop box.

The wireless LAN used in the communication system in accordance with the present embodiment complies with the IEEE 802.11 wireless communication standards developed for wireless LAN technology. Also, it is assumed that an IEEE 802.11e standard be agreed upon. The standard would constitute a part of the IEEE 802.11 wireless communication standards which is aimed at the realization of QoS (Quality of Service) communication, for example, real time AV data transfer. The HCF above is implemented upon this assumption.

Let us suppose that the HC 1 specify the following schedule: First, referring to the arrangement in FIG. 2, the ESTA-A 2 and the ESTA-B 3, for example, receive QoS CF-POLL①  and QoS CF-POLL② respectively at associated timings. In TXOP①, the ESTA-A 2 transmits data to a communication device. In TXOP②, the ESTA-B 3 transmits data to a communication device. In the CP, the ESTA-C 4 and the ESTA-D 5 transmits data to respective communication devices using DCF① and DCF②. That is, when the HC 1 can perform normal scheduling, a process is carried out in the above sequence described in reference to FIG. 12($a$).

(HC and ESTA Structure)

Now, the following will describe functional arrangements of the HC and the ESTA, particularly data transmission/reception functions of the HC and the ESTA. Regarding data transmission/reception, the HC and the ESTA has similar functions; a common functional block diagram will be used in the following description of both the HC and the ESTA. The HC and the ESTA of course differ from each other in other functions, which will not be described here.

Figure 4:
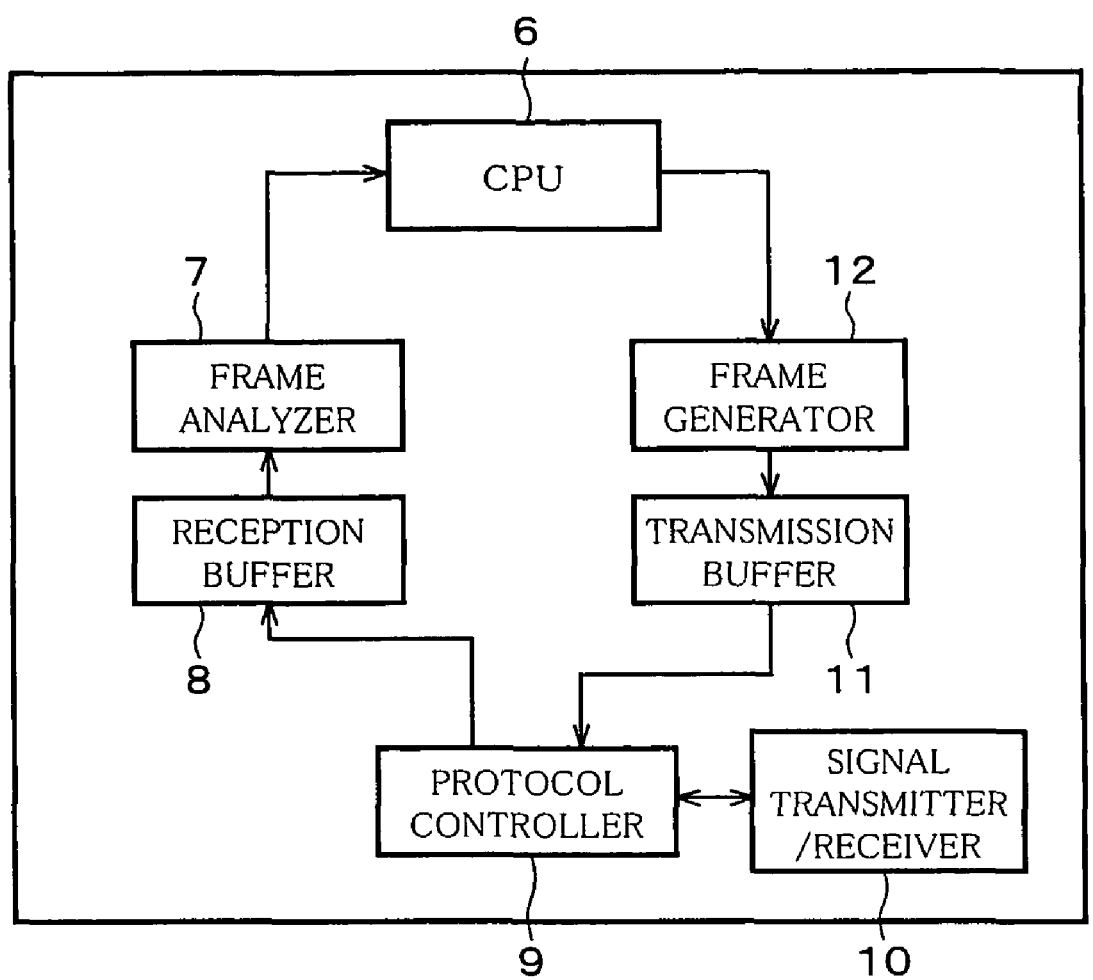
FIG. 4 is a block diagram depicting functions of the HC and the ESTA.

FIG. 4 is a functional block diagram for the HC and the ESTA. As shown in the figure, the HC and the ESTA each include a CPU (Central Processing Unit) 6, a frame analyzer 7, a reception buffer 8, a protocol controller 9, a signal transmitter/receiver 10, a transmission buffer 11, and a frame generator 12.

Assuming this structure, the following will describe (1) an HC transmitting a QoS CF-POLL to an ESTA to grant a TXOP to the ESTA and (2) the destination ESTA recognizing either a successful reception of the QoS CF-POLL or a failed reception of a frame.

First, the CPU 6 in the HC decides granting of a TXOP to an ESTA in scheduling based on information given in advance by all the ESTAs on the network. The CPU 6 in the HC then sends, to the frame generator 12 in the HC, information on a period in which a TXOP is to be granted, the address to which the TXOP is to be granted, and an instruction to start the generation of a QoS CF-POLL frame.

The frame generator 12 in the HC generates a QoS CF-POLL frame containing the information on a period in which a TXOP is to be granted and the information on the address of the ESTA which is to be granted the TXOP as the address information. The generator 12 then stores the QoS CF-POLL frame in the transmission buffer 11 in the HC.

Thereafter, the protocol controller 9 in the HC first determines whether the HC is currently allowed to make a transmission in accordance with procedures defined in a protocol (for example, if another communication device is transmitting a wireless signal over a communication medium, the HC must wait for a break in the signal transmission). If it is determined that a frame can be transmitted, the protocol controller 9 in the HC obtains the QoS CF-POLL frame from the transmission buffer 11 in the HC for conversion to wireless signal. The resultant wireless signal is output to a wireless medium via the signal transmitter/receiver 10 in the HC.

The wireless signal output from the HC is received in the signal transmitter/receiver 10 in the ESTA. The received signal is stored in the reception buffer 8 in the ESTA. The frame analyzer 7 in the ESTA analyzes the signal stored in the reception buffer 8 in the ESTA in some cases by, for example, error detection. When the signal is determined to be a correct frame, the frame analyzer 7 in the ESTA reports to the CPU 6 in the ESTA the type of the received frame and other information contained in the frame. This concludes a reception process.

If the received signal is determined by, for example, error detection not to be a correct frame (the signal may contain noise or be incomplete), the frame analyzer 7 in the ESTA reports the failed reception to the CPU 6 in the ESTA, which concludes the reception process.

Having learned of a correct reception of the QoS CF-POLL frame, the CPU 6 in the ESTA records a TXOP duration granted to the ESTA and recognizes the initiation of the TXOP, on the basis of the information, on the period in which the TXOP is granted, contained in the received QoS CF-POLL and sent from the frame analyzer 7 in the ESTA. The ESTA then transmits, for example, data frames which the CPU 6 determines that the ESTA should transmit until the granted TXOP duration ends.

Now, referring to FIG. 4, the following will describe (1) a TXOP-granted ESTA (hereinafter, a "TXOP holder") transmitting a FINAL FRAME (transmission right return frame) to end the TXOP and (2) a destination HC recognizing either a successful reception of the FINAL FRAME or a failed reception of the frame.

If the TXOP holder has run out of data frame to be transmitted before the granted TXOP duration ends, the TXOP holder transmits a frame called a FINAL FRAME. The FINAL FRAME may be one of several types. The present embodiment will use a FINAL FRAME called a QUEUE STATE frame as an example.

The QUEUE STATE frame contains information on the remaining data volume to be transmitted from the TXOP holder. A single set of information on remaining data volume may be created covering a plurality of streams individually. Accordingly, if the TXOP holder is transmitting a plurality of data streams in a granted TXOP duration, a single set of information may show the remaining data volume for each stream.

Next, the stream will be described in more detail. As shown in FIG. 11(a), conventional IEEE 802.11 specifications allow a TXOP-granted ESTA to transmit data to a plurality of ESTAs within a permitted time period. In other words, two or more streams can be transmitted. Besides, as shown in FIG. 11(b), the ESTA transmitting two or more streams is allowed to specify the ratio of data transmissions for the stream 1 and the stream 2 in the granted TXOP duration.

When this is the case, it would be preferred if the HC is informed of the remaining data volume for each stream. A conventional FINAL FRAME however cannot contain information on more than one stream. Therefore, the present embodiment defines the aforementioned new frame called the QUEUE STATE frame as the FINAL FRAME, enabling the HC to be informed of the remaining data volume for each stream by the use of the QUEUE STATE frame. Thus, the HC can learn of the remaining data volume for each stream from each ESTA. Scheduling can be adjusted more accurately.

In other words, once the CPU 6 in the TXOP holder has decided to transmit a QUEUE STATE frame, the CPU 6 sends, to the frame generator 12 in the TXOP holder, information on the individual remaining data volumes of all streams to be reported to the HC and an instruction to start the generation of a QUEUE STATE frame. The frame generator 12 in the TXOP holder generates a QUEUE STATE frame containing the reported information on the remaining data volume and the HC address information as the address information. The generator 12 then stores the QUEUE STATE frame in the transmission buffer 11 in the TXOP holder.

Thereafter, the protocol controller 9 in the TXOP holder first determines whether the TXOP holder is currently allowed to make a transmission in accordance with procedures defined in the protocol. If it is determined that data can be transmitted, the protocol controller 9 in the TXOP holder obtains the QUEUE STATE frame from the transmission buffer 11 in the TXOP holder for conversion to wireless signal. The resultant wireless signal is output to a wireless medium via the signal transmitter/receiver 10.

The wireless signal output from the TXOP holder is received in the signal transmitter/receiver 10 in the HC. The received signal is stored in the reception buffer 8 in the HC. The frame analyzer 7 in the HC analyzes the signal stored in the reception buffer 5 and reports a result to the CPU 6 in the HC. Further details of the process will not given here because it is similar to the foregoing process implemented when the ESTA receives a QoS CF-POLL.

The subsequent part of the description will discuss error correction. Under the HCF of IEEE 802.11, Reed Solomon coding ("RS coding"), an error correction process, is sometimes used in frame transmission. The error correction is an implementation of a certain encoding scheme on frames at the transmitting end. To put it differently, the receiving end cannot analyze the content of the frames unless it decodes encoded signals. Therefore, the receiving station cannot know the frame type and whether an acknowledgement is required for the frame, before the RS decoding completes.

The HCF of IEEE 802.11 specifies that a frame for which an acknowledgement is required is received by an ESTA in a TXOP duration, and the ESTA shall return an acknowledgement frame in an SIFS after the completion of the reception. In the present embodiment, acknowledgement frames are transmitted for the FINAL FRAME as a transmission right return frame and the QoS CF-POLL as a transmission right grant frame. The communication device, having received a FINAL FRAME or a QoS CF-POLL, needs to transmit an acknowledgement frame within an SIFS after the completion of the frame reception.

The SIFS is relatively short. If a FINAL FRAME or a QoS CF-POLL is RS encoded before transmission, the receiving station, depending on how it implements RS decoding, may fail to complete RS decoding within an SIFS in which an acknowledgement frame should be transmitted for the received frame. When this is the event, the FINAL FRAME or QoS CF-POLL receiving station can recognize that it needs to return an acknowledgement frame for a received frame, only when the SIFS after the frame reception is over. That is, the receiving station cannot return an acknowledgement frame before the deadline. Therefore, in the present embodiment, RS coding of FINAL FRAMEs and QoS CF-POLLs for transmission is prohibited.

The subsequent part of the description in reference to FIG. 4 will discuss (1) a first communication apparatus (ESTA or HC) returning an acknowledgement frame for a received frame, and (2) a second communication apparatus, the addressee of the acknowledgement frame, recognizing either a correct or failed reception of the acknowledgement frame.

First, the frame analyzer 7 in the first communication apparatus analyzes a signal stored in the reception buffer 8 in a similar manner to the ESTA receiving a QoS CF-POLL. The analysis confirms correct reception and reports that to the CPU 6 in the first communication apparatus, and also reports to the CPU 6 whether an acknowledgement is required for the received frame.

If the CPU 6 in the first communication apparatus determines from the received information that an acknowledgement is required for the received frame, the CPU 6 sends information on the receiving end of the acknowledgement frame and an instruction to start the generation of an acknowledgement frame to the frame generator 12 in the first communication apparatus. The frame generator 12 in the first communication apparatus generates an acknowledgement frame containing the address information reported on the receiving-end communication apparatus as the address information, and stores the acknowledgement frame in the transmission buffer 11 in the first communication apparatus.

Thereafter, the protocol controller 9 in the first communication apparatus first determines whether the first communication apparatus is currently allowed to make a transmission in accordance with procedures defined in a protocol. If it is determined that data can be transmitted, the protocol controller 9 in the first communication apparatus obtains the acknowledgement frame from the transmission buffer 11 in the first communication apparatus for conversion to wireless signal. The resultant wireless signal is output to a wireless medium via the signal transmitter/receiver 10 in the first communication apparatus.

The wireless signal output from the first communication apparatus is received in the signal transmitter/receiver 10 in the second communication apparatus. The received signal is stored in the reception buffer 8 in the second communication apparatus. The frame analyzer 7 in the second communication apparatus analyzes the signal stored in the reception buffer 8 and reports a result to the CPU 6 in the second communication apparatus. Further details of the process in the second communication apparatus will not given here because it is similar to the foregoing process implemented when the ESTA receives a QoS CF-POLL.

(TXOP Ending Process)

Figure 3:
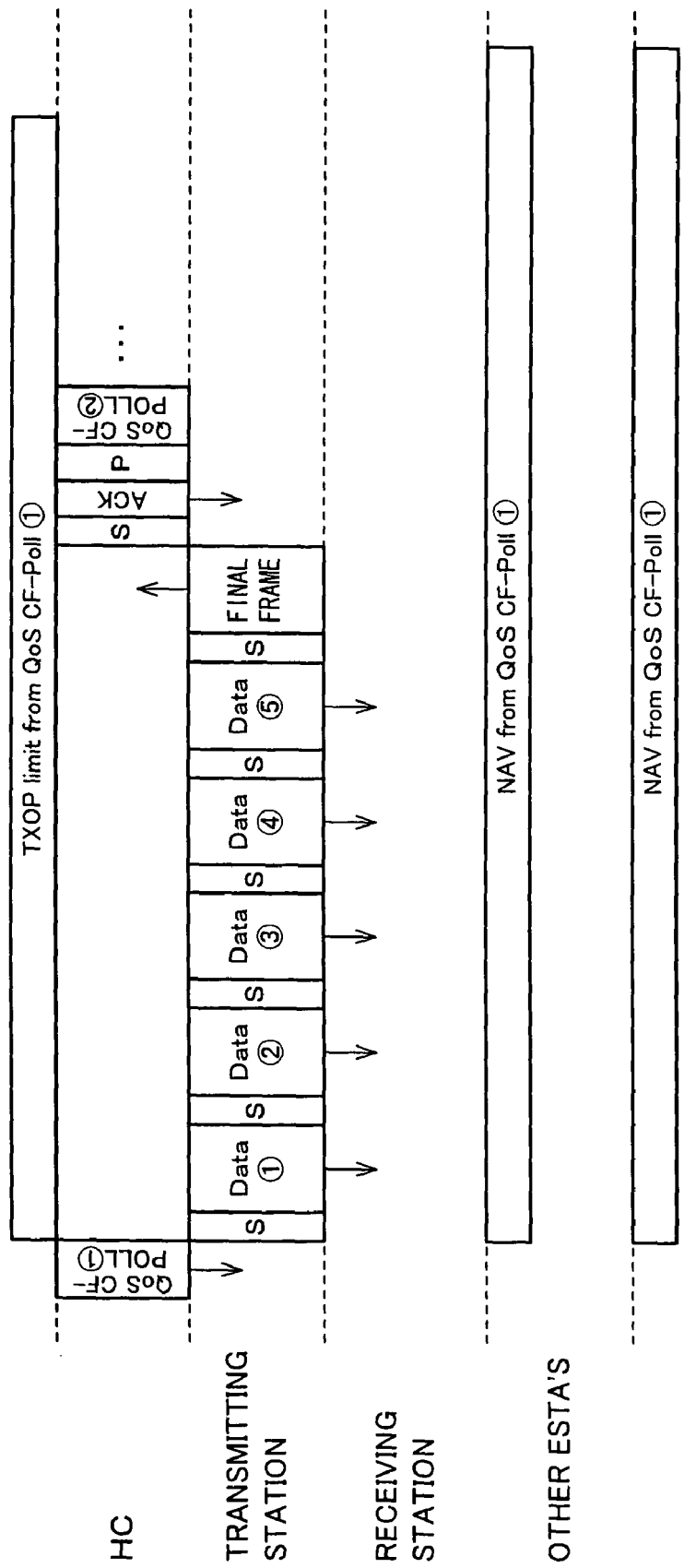
FIG. 3 is a timing chart illustrating a sequence of a TXOP ending process implemented by the HC, data transmitting station, data receiving station, and other ESTAs in the communication system, for cases where a frame is successfully transmitted/received between the HC and the transmitting station.

The subsequent part of the description will discuss details of an TXOP ending. FIG. 3 a timing chart illustrating a sequence of a data transmission/reception implemented by the HC, data transmitting station, data receiving station, and other ESTAs. Here, the HC is an equivalent to the HC 1 in FIG. 2, and the transmitting station is an equivalent to the ESTA-A 2 or ESTA-B 3 in FIG. 2. The receiving station is an equivalent to the data receiving ESTA. The other ESTAs are equivalents to those ESTAs which are basically not involved in a data transmission/reception in the TXOP.

First, the HC transmits QoS CF-POLL(1) to the ESTA-A 2 which is the transmitting station. Having successfully received QoS CF-POLL(1), the ESTA-A 2 recognizes that it now has a voluntary transmission right and then continuously transmits data frames (1) to (5) to an ESTA which is the receiving station.

Suppose that the ESTA-A 2 has no more frame to be transmitted after the transmission of data frame (5). In other words, the ESTA-A 2 has run out of frames to be transmitted before the TXOP LIMIT given by QoS CF-POLL(1) reaches 0. In these circumstances, the ESTA-A 2 transmits a FINAL FRAME as a TXOP ending frame to the HC after an SIFS following the completion of the transmission of last data frame (5) transmitted. The HC receives the FINAL FRAME and, an SIFS later, transmits an ACK as the acknowledgement frame to the ESTA-A 2 as a TXOP holder.

After the transmission of the FINAL FRAME, the ESTA-A 2 keeps monitoring other stations for a wireless signal output for a period called "PIFS." The PIFS (Point Coordination Inter Frame Space) is shorter than the DIFS and longer than the SIFS. If having detected a wireless signal output from another station in a PIFS, the ESTA-A 2 stands by until there is a break in the wireless signal transmission. A break in the wireless signal transmission enables the confirmation of the frames transmitted by the wireless signal. Thus, the ESTA-A 2 can know the content of the frames. If the HC has correctly received the FINAL FRAME, an ACK as the acknowledgement frame would be detected for the FINAL FRAME transmitted from the HC.

On a detection of an acknowledgement frame ACK transmitted from the HC as predicted, the ESTA-A 2 determines that the HC has correctly received the FINAL FRAME and that the returning of a voluntary transmission right to the HC has correctly completed. After the determination, the ESTA-A 2 operates assuming that it has no voluntary transmission right. That is, the ESTA-A 2 does not transmit a frame until it obtains a voluntary transmission right either by receiving another QoS CF-POLL addressed to it or through DCF.

The above sequence is implemented if a normal frame transmission/reception is performed between the HC and the transmitting station when the transmitting station ends a frame transmission in the middle of a TXOP. The subsequent part of the description will in reference to FIG. 1 discuss a sequence for cases where the frame transmission/reception between the HC and the transmitting station is not successfully done when the transmitting station ends a frame transmission in the middle of a TXOP.

First, the HC transmits QoS CF-POLL(1) to the ESTA-A 2 which is the transmitting station. The ESTA-A 2 continuously transmits data frames (1) to (5) to an ESTA which is the receiving station. Thereafter, the ESTA-A 2 transmits a FINAL FRAME as a TXOP ending frame to the HC after an SIFS following the completion of the transmission of last data frame (5) transmitted. The HC receives the FINAL FRAME and, an SIFS later, transmits an ACK as the acknowledgement frame to the ESTA-A 2 as a TXOP holder.

After the transmission of the FINAL FRAME, the ESTA-A 2 keeps monitoring other stations for a wireless signal output for a PIFS. If a wireless signal from another station is detected in a PIFS, the ESTA-A 2 stands by until there is a break in the wireless signal transmission. A break in the wireless signal transmission enables the confirmation of the frames transmitted by the wireless signal. Thus, the ESTA-A 2 can know the content of the frames.

Under these circumstances, three cases are possible: the wireless signal received by the ESTA-A 2 is (1) noise, (2) determined to be a wrong frame because of, for example, a CRC (cyclic redundancy checksum) error, or (3) a correct frame, but not the expected acknowledgement frame ACK for the FINAL FRAME. In these cases, the ESTA-A 2 determines that the HC has not correctly received the FINAL FRAME, and retransmits the FINAL FRAME after an SIFS following a break in the wireless signal transmission. That is, before determining whether or not the FINAL FRAME be retransmitted, the ESTA-A 2 stands by until the time when an acknowledgement frame ACK is expected to be transmitted.

Meanwhile, after the complete transmission of the acknowledgement frame ACK, the HC keeps monitoring other stations for a wireless signal output for a PIFS. If the ESTA-A 2 has correctly received an acknowledgement frame ACK for the FINAL FRAME, it does not retransmit the FINAL FRAME; therefore, no wireless signal is transmitted. In addition, non-TXOP-holder ESTAs have a non-0 NAV specified by the TXOP LIMIT of the QoS CF-POLL in a TXOP; therefore, no frame is transmitted in that period. Hence, no communication devices on the network would send a wireless signal. If the ESTA-A 2 has failed to correctly receive an acknowledgement frame ACK, the FINAL FRAME is retransmitted; therefore, the ESTA-A 2 sends a wireless signal.

On a failure to detect no wireless signal output from any communication devices for the PIFS, the HC determines that the ESTA-A 2 has correctly received an acknowledgement frame ACK and regarded the returning of the voluntary transmission right as being complete. Then, a next sequence, including a transmission of QoS CF-POLL②, is started to grant a TXOP to the ESTA-B 3.

In contrast, on a detection of a wireless signal output from any one of the communication devices in the PIFS, the HC determines that the ESTA-A 2 has not correctly received an acknowledgement frame ACK and regards the returning of the voluntary transmission right as being incomplete. When this is the case, no next sequence is started; the HC stands by again until a FINAL FRAME is transmitted from the ESTA-A 2.

In other words, before determining whether or not a next sequence be started, the HC stands by until the time when the FINAL FRAME is expected to be retransmitted. Note that beyond the TXOP LIMIT contained in QoS CF-POLL① transmitted to the ESTA-A 2, the ESTA-A 2 always abandons the voluntary transmission right. Hence, the HC starts a next sequence.

The foregoing description discussed that QoS CF-POLL is transmitted to the ESTA-B 3 as a next sequence after the HC has transmitted an acknowledgement frame ACK for a FINAL FRAME, that is, the processing of the HC granting a transmission right to ESTAs. Alternatively, the HC itself may transmit data frames to communication devices other than the HC. The content of the data frame transmitted may include moving images owned by the HC itself.

If no acknowledgement is required for the data frames transmitted from the HC, the data frames are continuously transmitted at SIFS intervals or PIFS intervals. If there arises again a need for the HC to grant a transmission right to an ESTA, a QoS CF-POLL is transmitted after a PIFS following the completion of a transmission of a data frame.

If an acknowledgement is required for the data frames transmitted from the HC, a communication device, having received a data frame transmitted from the HC, returns a corresponding acknowledgement frame after an SIFS. The HC transmits a next data frame after an SIFS or PIFS following the completion of a reception of the acknowledgement frame. If there arises again a need for the HC to grant a transmission right to an ESTA, a QoS CF-POLL is transmitted after a PIFS following the completion of a reception of an acknowledgement frame for the data frame.

In this manner, in the present embodiment, no wireless signal is transmitted from any communication devices for less than the DIFS. The transmission right granting scheduling in the HC is not disturbed by a communication device using DCF intercepting and initiating a frame transmission.

(Flow of TXOP Ending Process)

Figure 5:
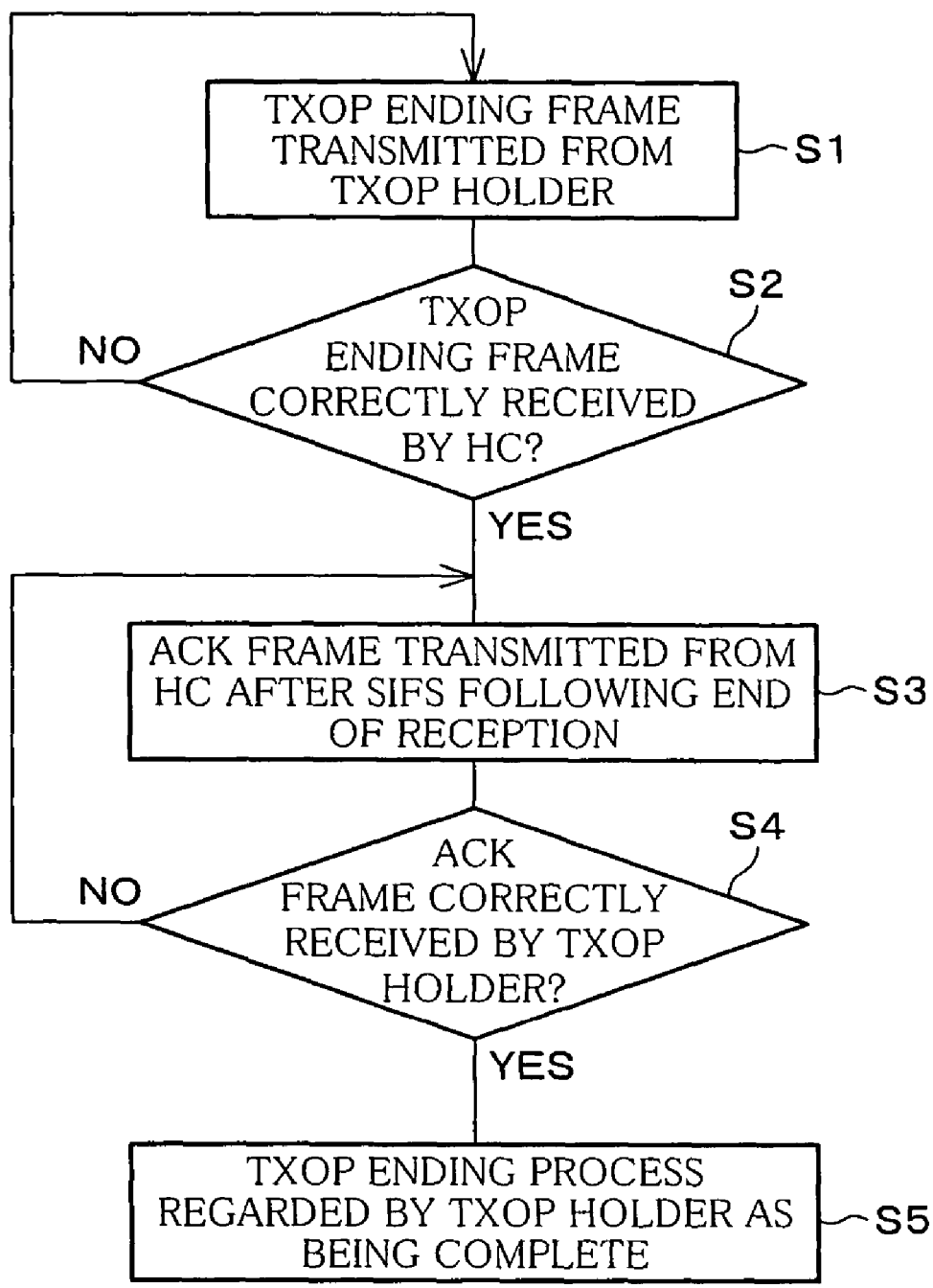
FIG. 5 is a flow chart showing an outline of a process relating to the ending of a TXOP involving the whole communication system.
Figure 6:
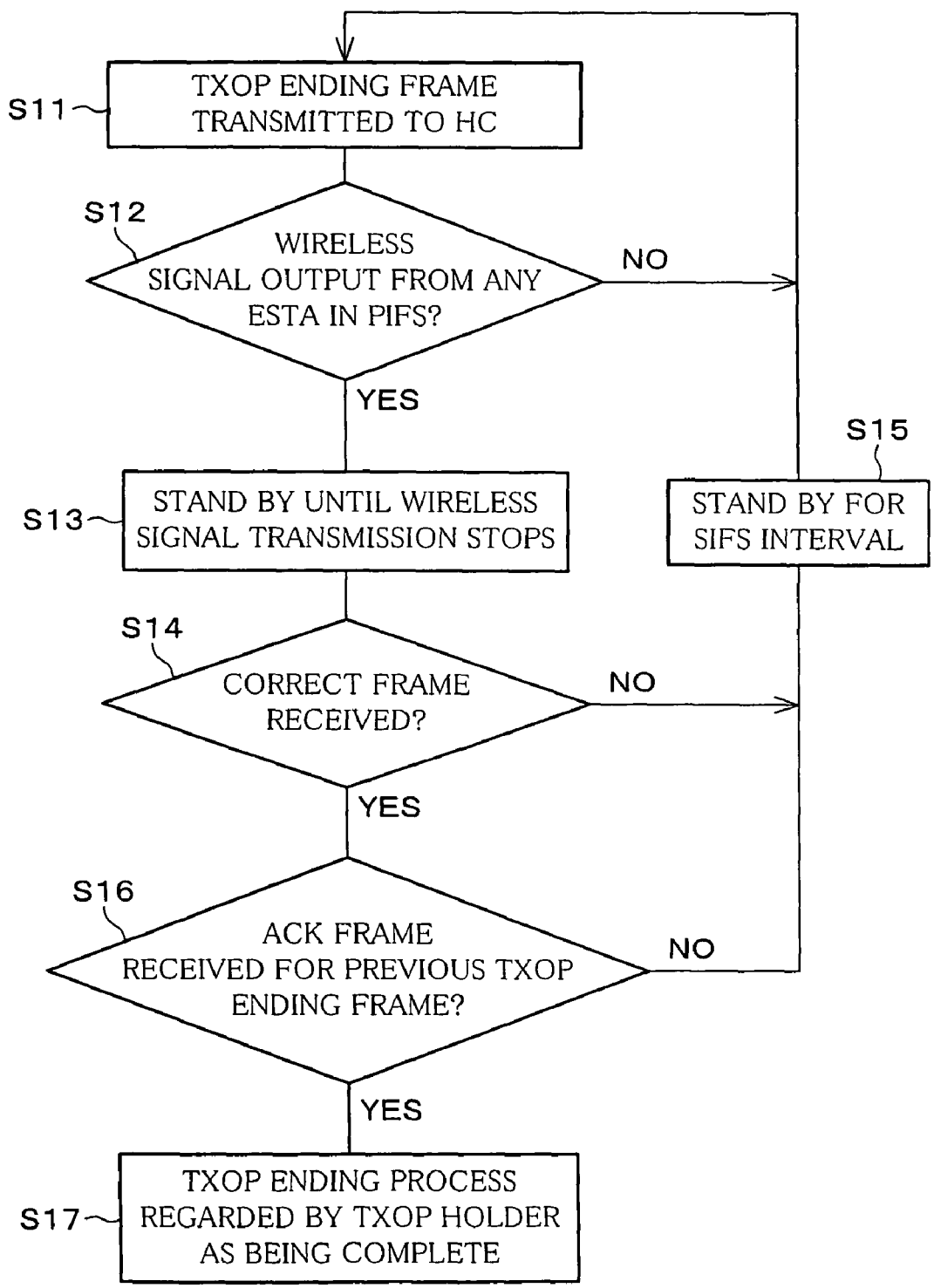
FIG. 6 is a flow chart showing the flow of a TXOP ending process implemented by a TXOP holder.
Figure 7:
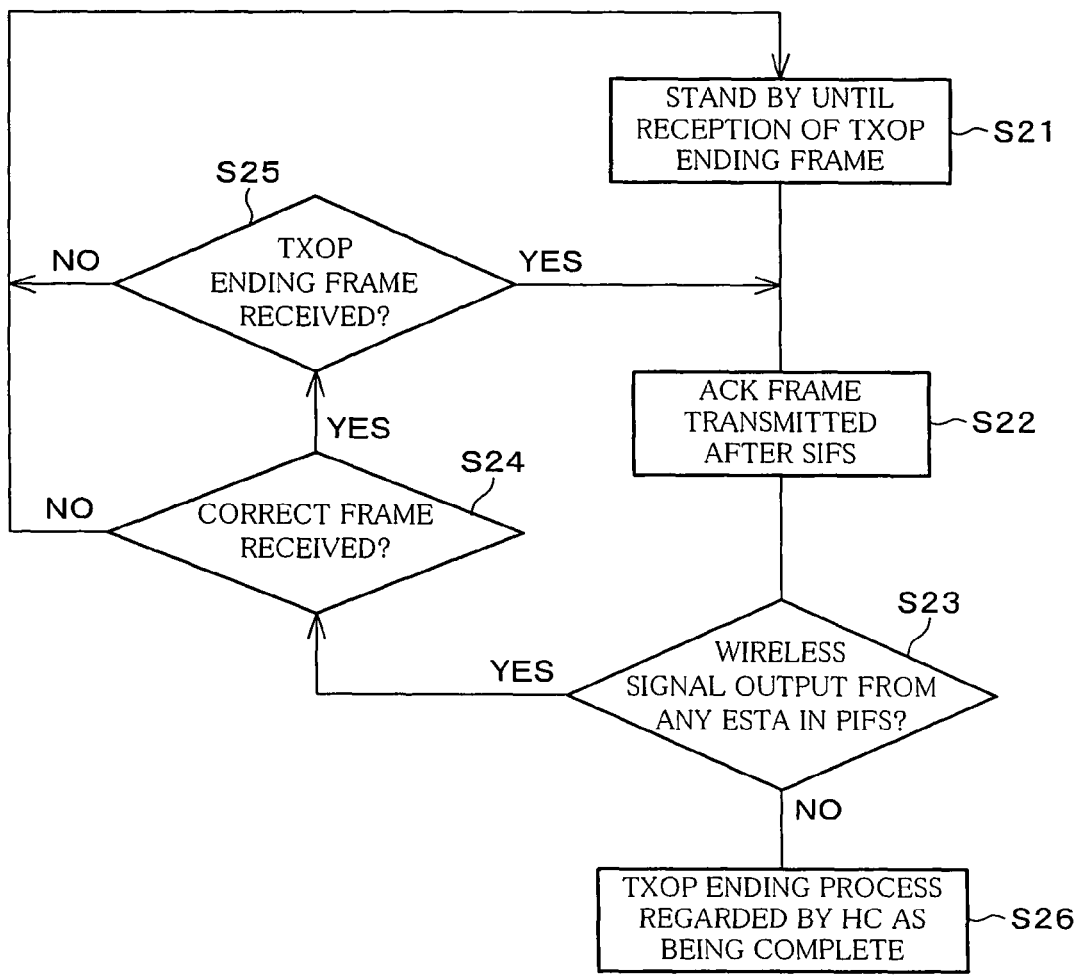
FIG. 7 is a flow chart showing the flow of a TXOP ending process implemented by an HC.

With reference to flow charts in FIG. 5 through FIG. 7, the subsequent part of the description will discuss the flow of a TXOP ending process implemented by the communication system in accordance with the present embodiment. FIG. 5 is a flow chart showing an outline of a process relating to the ending of a TXOP involving the whole communication system.

First, in step 1 ("S1"), the TXOP holder transmits a FINAL FRAME as a TXOP ending frame to the HC. If the HC has not correctly received the TXOP ending frame (NO in S2), the operation returns to S1 where the TXOP holder retransmits the TXOP ending frame.

In contrast, if the HC has correctly received the TXOP ending frame (YES in S2), the H C transmits an acknowledgement frame after an SIFS following the completion of the reception of the TXOP ending frame (S3). If the TXOP holder has failed to correctly receive the acknowledgement frame (NO in S4), the operation returns to S3 where the HC retransmits the acknowledgement frame.

In contrast, if the TXOP holder has correctly received the acknowledgement frame for the FINAL FRAME (YES in S4), the TXOP holder regards the TXOP ending process as being accurately complete (S5), therefore ending the process.

Referring to the flow chart in FIG. 6, the subsequent part of the description will discuss the flow of a part of the TXOP ending process which is executed by the TXOP holder. First, in S11, the TXOP holder transmits a TXOP ending frame to the HC. The TXOP holder then determines whether there is a wireless signal output from any of the ESTAs over the network in a PIFS following the completion of the transmission of the TXOP ending frame (S12). If the TXOP holder detects no wireless signal (NO in S12), the operation returns to S11 where the TXOP ending frame is retransmitted to the HC.

In contrast, if the operation takes the YES path in S12, that is, if a wireless signal is detected, the TXOP holder stands by until the wireless signal is transmitted completely (S13). When the transmission of the wireless signal is completed, the TXOP holder determines whether the frame is correct or not by analyzing the signal (S14). A correct frame refers to such a frame that its content is verifiable, that is, a frame free from noise or such a frame that the signal is complete.

If the operation takes the NO path in S14, that is, if the received wireless signal is determined not to be a correct frame, the operation returns to S11 where the TXOP ending frame is retransmitted to the HC after an SIFS following the completion of the reception of the wireless signal (S15).

In contrast, if the operation takes the YES path in S14, that is, if the received wireless signal is determined to represent a correct frame, the TXOP holder determines in S16 whether the received frame is an acknowledgement frame for the TXOP ending frame transmitted previously.

If the operation takes the NO path in S16, that is, if the received frame is determined not to be an appropriate acknowledgement frame, the operation returns, after an SIFS following the completion of the reception of the frame, to S11 where the TXOP ending frame is retransmitted to the HC (S15).

In contrast, if the operation takes a YES path in S16, that is, if the received frame is determined to be an appropriate acknowledgement frame, the TXOP holder regards the TXOP ending process as being accurately complete (S17), therefore ending the process.

Referring to the flow chart in FIG. 7, the subsequent part of the description will discuss the flow of a part of the TXOP ending process which is executed by the HC. First, in S21, the HC is standing by until the HC receives a TXOP ending frame from the TXOP holder. On the reception of a TXOP ending frame, the operation proceeds to S22 where the HC transmits an acknowledgement frame to the TXOP holder after an SIFS following the completion of the reception of the TXOP ending frame.

Then, the HC determines whether there is a wireless signal output from any of the ESTAs in a PIFS following the completion of the transmission of the acknowledgement frame (S23). If a wireless signal transmission is confirmed (YES in S23), the HC determines in S24 whether the received wireless signal is a correct frame.

If the operation takes the NO path in S24, that is, if the received wireless signal is determined not to be a correct frame, the operation returns to S21 where the HC stands by to receive a TXOP ending frame. In contrast, if the operation takes the YES path in S24, that is, if the received wireless signal is determined to be a correct frame, the HC determines in S25 whether the received frame is a TXOP ending frame.

If the operation takes the NO path in S25, that is, if the received frame is determined not to be a TXOP ending frame, the operation returns to S21 where the HC stands by to receive a TXOP ending frame from the TXOP holder. In contrast, if the operation takes the YES path in S25, that is, if the received frame is determined to be a TXOP ending frame, the HC determines that the TXOP holder has retransmitted the TXOP ending frame because the acknowledgement frame transmitted in S22 failed to accurately reach the TXOP holder. The operation then returns to S22 where the HC retransmits the acknowledgement frame after an SIFS following the completion of the reception of the TXOP ending frame.

In contrast, if the operation takes the NO path in S23, that is, if the HC determines that there has been no wireless signal output from any ESTAs in a PIFS after the completion of the transmission of the acknowledgement frame, the HC regards the TXOP ending process as being accurately complete, therefore ending the process.

In the present embodiment, the ESTAs other than the TXOP holder receiving a FINAL FRAME do not have their NAVs specified to 0. This ensures that the NAVs of the non-TXOP-holder ESTAs are not 0 in a TXOP. In other words, in ordinary situations, the non-TXOP-holder ESTAs do not initiate a transmission in a TXOP.

However, if there is an ESTA which has failed to receive a QoS CF-POLL on the network, the NAV of that ESTA is not specified by the TXOP LIMIT of the QoS CF-POLL. This creates a possibility that the NAV of the ESTA may reach 0 even in a TXOP. The ESTA with a 0 NAV due to these reasons may intercept a transmission if there occurs no wireless signal output from any communication devices in a frame exchange sequence between the TXOP holder and the HC for the DIFS or longer than the DIFS.

This potential problem is well addressed in the present embodiment: intervals between frames are determined so as to prevent there from occurring no wireless signal output from any communication devices for the DIFS or longer. Thus, chances are low that another ESTA may intercept in a TXOP ending process.

If a TXOP holder has run out of frames to be transmitted before the TXOP granted by a QoS CF-POLL ends, the TXOP holder executes the foregoing TXOP ending process.

If the HC does not grant a voluntary transmission right to another ESTA after the TXOP ending process is completed, the ESTAs on the network can initiate a transmission under DCF. Note that under DCF, it is only ESTAs with a 0 NAV that may obtain a voluntary transmission right.

By conventional TXOP ending methods, the ESTA having received a TXOP ending frame resets its NAV to 0, and therefore can initiate a transmission under DCF immediately after the TXOP ending process is completed.

In contrast, in the present embodiment, to further the reliability of the TXOP ending process, a rule is provided disallowing the ESTA having received the TXOP ending frame to reset the NAV to 0. The ESTA does not reset the NAV to 0 unless something is done. No ESTAs can initiate a transmission under DCF until the NAV value specified by the QoS CF-POLL at the start of the TXOP is counted down to 0 with time. If there is no scheduled grant of a transmission right from the HC to another ESTA or scheduled voluntary data transmission in that period, there is no transmission from any ESTA on the network, which is a waste of bandwidth. To address this problem, a mechanism of some form is required which resets the NAV of an ESTA so that the ESTA can initiate a transmission under DCF.

The mechanism is materialized in the present embodiment by the HC transmitting a frame of some kind to explicitly permit the initiation of a transmission under DCF. That frame may be the QoS CF-POLL frame which the HC transmitted to the HC itself with the TXOP LIMIT value set to 0.

Suppose that the TXOP holder and HC implemented a TXOP ending process as described above with the HC determining that the TXOP ending process was successfully completed. If there is no scheduled grant of a voluntary transmission right to another ESTA or scheduled voluntary data transmission from the HC itself, the HC transmits a QoS CF-POLL frame to itself with the TXOP LIMIT value set to 0. The ESTA having received the QoS CF-POLL frame sets the NAV of the ESTA itself to 0. Thus, the NAV is reset only when the HC explicitly permits the resetting. The HC is not disturbed by an unexpected ESTA.

Alternatively, the frame transmitted from the HC to explicitly permit the initiation of a transmission under DCF may be a CF-END frame or a QoS CF-END frame, to name a few. The CF-END frame is originally a frame transmitted to explicitly permit the termination of a period called CFP (Contention Free Period) which is defined in IEEE 802.11. The QoS CF-END frame is defined in HCF, IEEE 802.11, but its usage is yet to be clarified in the current version of the specifications.

(TXOP Grant Process)

The foregoing part of the description discussed the TXOP ending process. A TXOP grant process can be implemented by a similar process. The subsequent part of the description will describe a TXOP grant process.

Having decided to grant a TXOP to an ESTA, the HC transmits a QoS CF-POLL frame (transmission right grant frame) to the ESTA. The TXOP holder transmits an acknowledgement frame to the HC after an SIFS following the reception of the QoS CF-POLL frame.

After the transmission of the QoS CF-POLL frame, the HC keeps monitoring other stations for a wireless signal output for a PIFS which is shorter than the DIFS and longer than the SIFS. If having detected a wireless signal output from another station in a PIFS, the HC stands by until there is a break in the wireless signal transmission.

The HC can know the content of the frames when there is a break in the wireless signal transmission. Under these circumstances, if the TXOP holder has successfully received the QoS CF-POLL frame, an acknowledgement frame would be detected for the FINAL FRAME transmitted by the TXOP holder.

On a detection of an acknowledgement frame transmitted from the TXOP holder as predicted, the HC determines that the TXOP holder has correctly received the QoS CF-POLL frame and that the granting of a voluntary transmission right to the TXOP holder has correctly completed. After the determination, the HC operates assuming that it has no voluntary transmission right. That is, the HC does not transmit a frame until the granted TXOP duration expires or the TXOP holder transmits a TXOP ending frame.

Meanwhile, if the wireless signal received by the HC does not represent a correct frame because it is noise or it contains CRC error, for example, or does represent a correct frame, but not the expected acknowledgement frame, the HC determines that the TXOP holder has not correctly received the QoS CF-POLL frame, and retransmits the QoS CF-POLL frame after an SIFS following a break in the wireless signal transmission. That is, the HC waits until the time when a transmission of an acknowledgement frame is expected, before determining whether the HC will retransmit the QoS CF-POLL frame.

The HC repeatedly retransmits the QoS CF-POLL frame until it successfully receives an acknowledgement frame. If the process was infinitely repeated, the HC would fail to grant the voluntary transmission right to another ESTA as scheduled. To avoid this from happening, the retransmission is suspended under certain conditions. For example, retransmission may be given up after TXOP, which is originally scheduled to be granted to the ESTA, following the initiation of the first transmission of the QoS CF-POLL. Other conditions may be used.

Meanwhile, the TXOP holder keeps monitoring other stations for a wireless signal output in a PIFS after the transmission of the acknowledgement frame. If the HC has correctly received the acknowledgement frame ACK, there are no retransmissions of the QoS CF-POLL frame, and the HC transmits no wireless signals. In addition, in TXOP, non-TXOP-holder ESTAs have a non-zero NAV whose value was given by the TXOP LIMIT of the QoS CF-POLL, and do not initiate a frame transmission. No devices on the network would transmit a wireless signal.

In contrast, if the HC has failed to correctly receive the acknowledgement frame ACK, there occurs a retransmission of the QoS CF-POLL frame, and the HC transmits a wireless signal.

On a failure to detect a wireless signal output from any station in a PIFS, the TXOP holder determines that the HC has correctly received the acknowledgement frame and therefore regarded the granting of the voluntary transmission right as being complete. The TXOP holder then initiates a transmission of a frame which the TXOP holder is to transmit.

In contrast, on a detection of a wireless signal output from a station in a PIFS, the TXOP holder determines that the HC has not correctly received the acknowledgement frame and therefore regarded the granting of the voluntary transmission right as being incomplete. The TXOP holder waits for a retransmission of the QoS CF-POLL frame from the HC without initiating a transmission of a frame which the TXOP holder is to transmit. In other words, the TXOP holder waits until the time when a retransmission of the QoS CF-POLL frame is expected, before determining whether the TXOP will initiate a transmission of a frame which the TXOP holder is to transmit.

If the TXOP holder has data to be transmitted, data frames are transmitted in the following sequence. If no acknowledgement is required for the data frames transmitted from the TXOP holder, the data frames are continuously transmitted at SIFS intervals. If there arises again a need for the TXOP holder to return the transmission right to the HC because, for example, the TXOP holder has no more data to be transmitted, the TXOP holder transmits a FINAL FRAME to the HC after an SIFS following the completion of the transmission of the last data frame.

When an acknowledgement is required for the data frames transmitted from the TXOP holder, a communication device, having received a data frame transmitted from the TXOP holder, returns a corresponding acknowledgement frame after an SIFS. The TXOP holder transmits a next data frame after an SIFS following the completion of a reception of the acknowledgement frame. If there arises again a need for the TXOP holder to return the transmission right to the HC because, for example, the TXOP holder has no more data to be transmitted, the TXOP holder transmits a FINAL FRAME to the HC after an SIFS following the completion of the reception of an acknowledgement frame for the data frame.

In contrast, if the TXOP holder has no data to be transmitted, the TXOP transmits a FINAL FRAME to the HC to return the transmission right to the HC quickly. Specific steps of implementing the process were already described in the foregoing.

In this manner, in the present embodiment, no wireless signal is transmitted from any communication devices for less than the DIFS in a transmission right grant process. The transmission right granting scheduling in the HC is not disturbed by a communication device using DCF intercepting and initiating a frame transmission.

(Flow of TXOP Grant Process)

Figure 8:
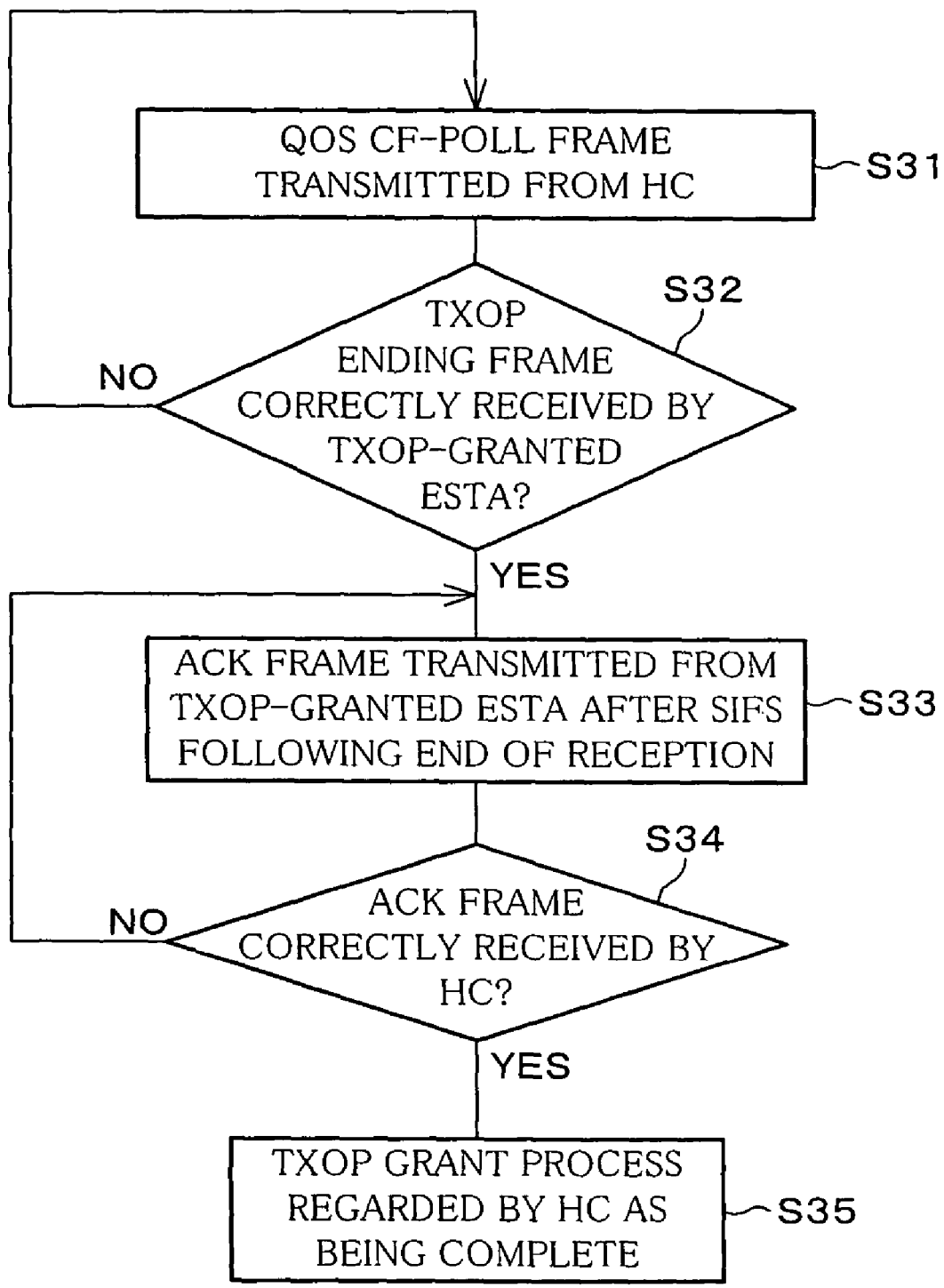
FIG. 8 is a flow chart showing an outline of a process relating to a grant of a TXOP involving the whole communication system.
Figure 9:
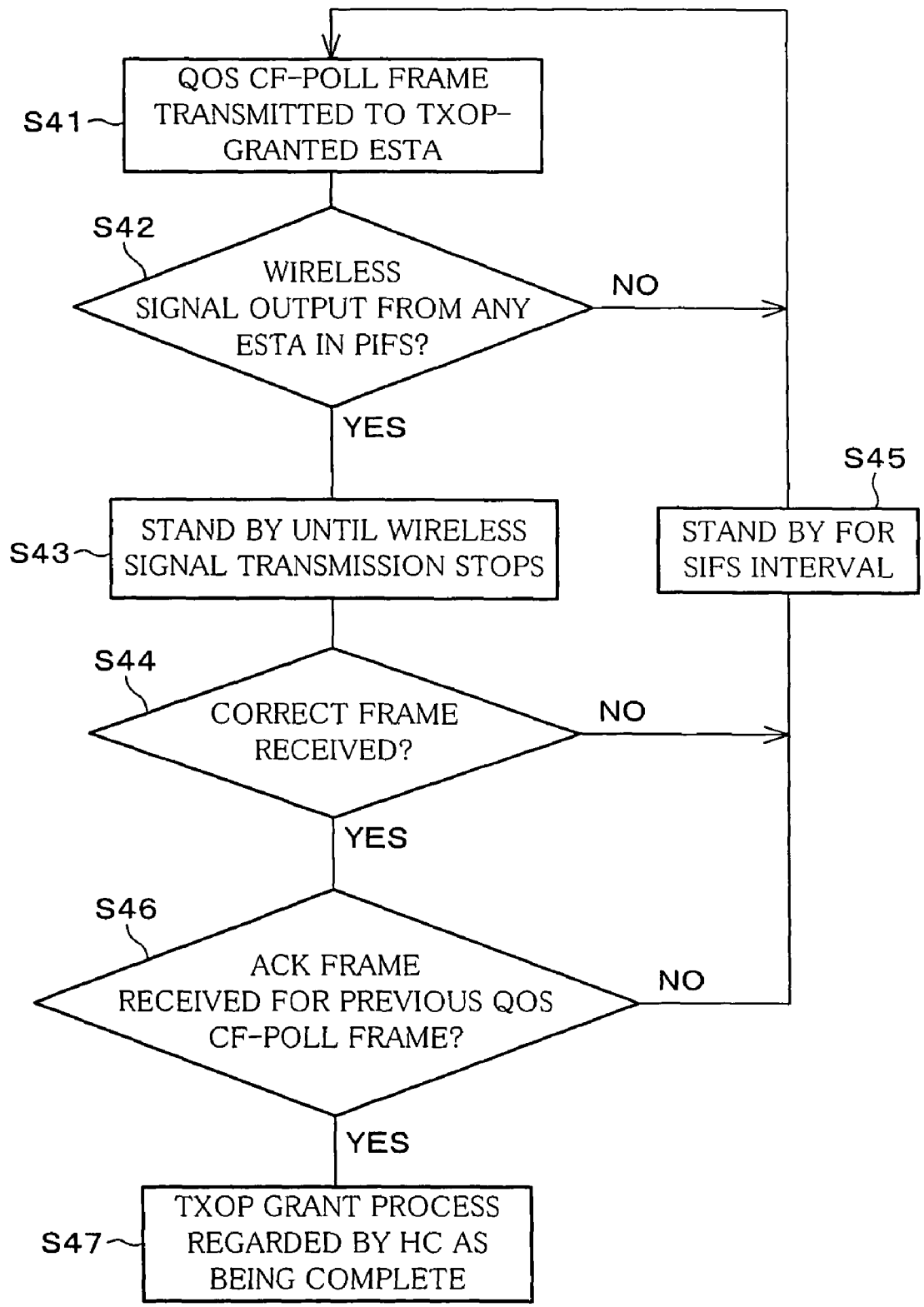
FIG. 9 is a flow chart showing the flow of a TXOP grant process implemented by an HC.
Figure 10:
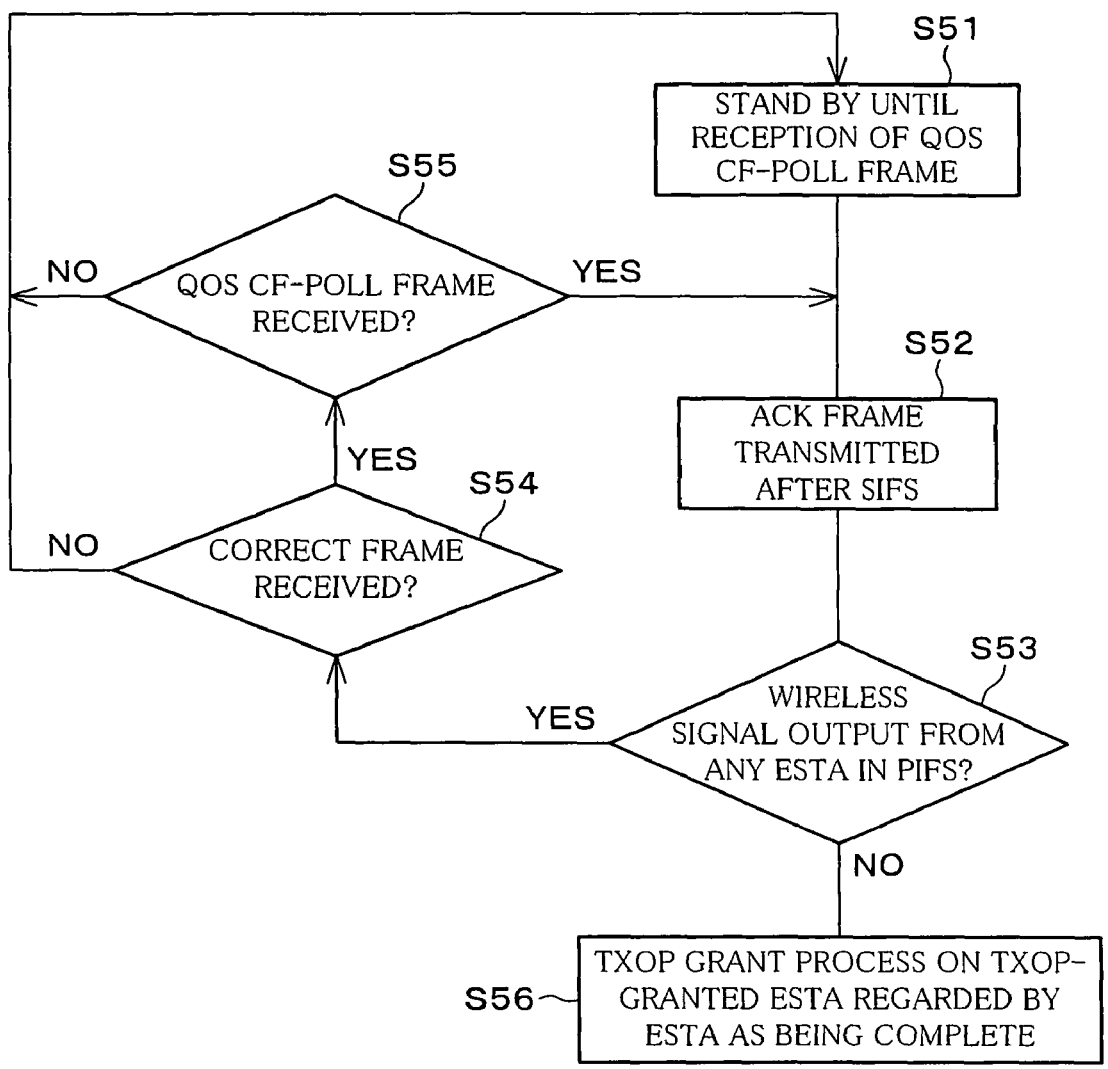
FIG. 10 is a flow chart showing the flow of a TXOP grant process implemented by a TXOP-granted ESTA.
Figure 11:
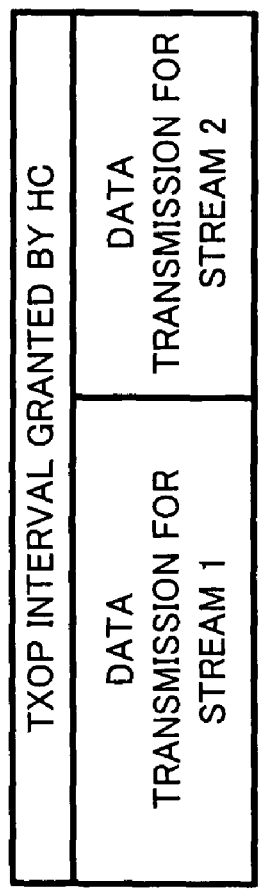
FIG. 11($a$) is an explanatory drawing illustrating a TXOP-granted ESTA transmitting a set of streams, whereas FIG. 11($b$) is an explanatory drawing illustrating, as an example, how a TXOP duration is split between a set of streams when a TXOP-granted ESTA transmits the set of streams.
Figure 11:
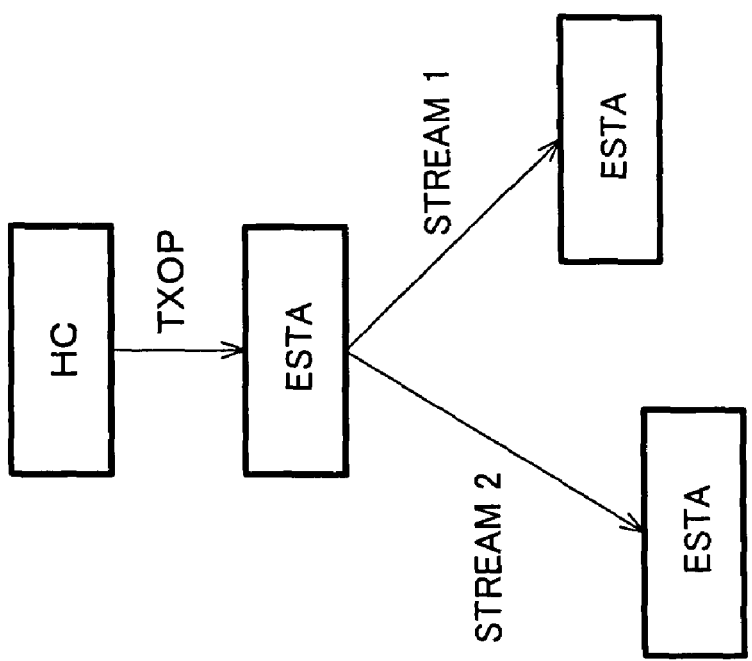

The subsequent part of the description will discuss the flow of the TXOP grant process in reference to the flow charts in FIG. 8 through FIG. 10. FIG. 8 is a flow chart showing an outline of the TXOP grant process involving the whole communication system.

First, in S31, the HC transmits a QoS CF-POLL frame to an ESTA to which a TXOP will be granted. If the ESTA has failed to correctly receive the QoS CF-POLL frame (NO in S32), the operation returns to S31 where the HC retransmits the QoS CF-POLL frame, In contrast, if the ESTA to which a TXOP will be granted has correctly received the QoS CF-POLL frame (YES in S32), the ESTA transmits an acknowledgement frame after an SIFS following the completion of the reception of the QoS CF-POLL frame (S33). If the HC has failed to correctly receive the acknowledgement frame (NO in S34), the operation returns to S33 where the ESTA retransmits the acknowledgement frame.

In contrast, if the HC has correctly received the acknowledgement frame (YES in S34), the HC regards the TXOP grant process as being accurately complete (S35), therefor ending the process.

Referring to the flow chart in FIG. 9, the subsequent part of the description will discuss a part of the flow of the TXOP grant process which is implemented by the HC. First, in S41, the HC transmits a QoS CF-POLL frame to an ESTA to which a TXOP will be granted. The HC then determines whether there has been a wireless signal output from any ESTA over the network in a PIFS following the completion of the transmission of the QoS CF-POLL frame (S42). If no wireless signal is detected (NO in S42), the operation returns to S41 where the HC retransmits the QoS CF-POLL frame to the ESTA.

In contrast, if the operation takes the YES path in S42, that is, if any wireless signal is detected, the HC stands by in S43 until a completion of the wireless signal transmission. Upon the completion of the wireless signal transmission, the HC determines whether the frame is correct or not by analyzing the signal (S44). A correct frame refers to such a frame that its content is verifiable, that is, a frame free from noise or such a frame that the signal is complete.

If the operation takes the NO path in S44, that is, if the received wireless signal is determined not to be a correct frame, the operation returns to S41 where the HC retransmits the QoS CF-POLL frame to the ESTA after an SIFS following the completion of the reception of the wireless signal (S45).

In contrast, if the operation takes the YES path in S44, that is, if the received wireless signal is determined to be a correct frame, the HC determines in S46 whether the received frame is an acknowledgement frame for the QoS CF-POLL frame transmitted previously.

If the operation takes the NO path in S46, that is, if the received frame is determined not to be an appropriate acknowledgement frame, the operation returns, after an SIFS following the completion of the reception of the frame, to S41 where the HC retransmits the QoS CF-POLL frame to the ESTA to which a TXOP will be granted (S45).

In contrast, if the operation takes the YES path in S46, that is, if the received frame is determined to be an appropriate acknowledgement frame, the HC regards the TXOP grant process as being accurately complete (S47), therefore ending the process.

Referring to the flow chart in FIG. 10. First, in S51, the subsequent part of the description will discuss a part of the flow of the TXOP grant process which is implemented by the TXOP-granted ESTA. The ESTA is standing by until the ESTA receives a QoS CF-POLL frame from the HC. On the reception of a QoS CF-POLL frame, the operation proceeds to S52 where the ESTA transmits an acknowledgement frame to the HC after an SIFS following the completion of the reception of the QoS CF-POLL frame.

Then, the ESTA determines whether there is a wireless signal output from any of the ESTAs in a PIFS following the completion of the transmission of the acknowledgement frame (S53). If a wireless signal transmission is confirmed (YES in S53), the ESTA determines in S54 whether the received wireless signal is a correct frame.

If the operation takes the NO path in S54, that is, if the received wireless signal is determined not to be a correct frame, the operation returns to S51 where the ESTA stands by to receive a QoS CF-POLL frame. In contrast, if the operation takes the YES path in S54, that is, if the received wireless signal is determined to be a correct frame, the ESTA determines in S55 whether the received frame is a QoS CF-POLL frame.

If the operation takes the NO path in S55, that is, if the received frame is determined not to be a QoS CF-POLL frame, the operation returns to S51 where the ESTA stands by to receive a QoS CF-POLL frame from the HC. In contrast, if the operation takes the YES path in S55, that is, if the received frame is determined to be a QoS CF-POLL frame, the ESTA determines that the HC has retransmitted the QoS CF-POLL frame because the acknowledgement frame transmitted in S52 failed to accurately reach the HC. The operation then returns to S52 where the ESTA retransmits the acknowledgement frame after an SIFS following the completion of the reception of the QoS CF-POLL frame.

In contrast, if the operation takes the NO path in S53, that is, if the ESTA determines that there has been no wireless signal output from any other ESTAs in a PIFS after the completion of the transmission of the acknowledgement frame, the ESTA regards the TXOP grant process as being accurately complete, therefore ending the process.

(Frame Interval)

The subsequent part of the description will discuss intervals between frames in a frame transmission/reception sequence of the present embodiment.

A DIFS here is an equivalent to that in the IEEE 802.11 specifications, and defined as a period of time (the thirteenth, third, or eighth period) in which the communication device without a voluntary transmission right may possibly initiate a frame transmission. An SIFS is defined as a period of time (the eleventh, first, or sixth period) in which the communication device to which a voluntary transmission right is to be transferred (HC, TXOP-granted ESTA) transmits an acknowledgement frame after the communication device receives a voluntary transmission right transfer frame (FINAL FRAME (transmission right return frame), QoS CF-POLL frame (transmission right grant frame)). A PIFS is defined as a period of time (the twelfth, second, or seventh period) in which the communication device with a voluntary transmission right (TXOP holder or HC) determines whether an acknowledgement frame has been transmitted after the communication device transmitted a transmission right transfer frame (FINAL FRAME, QoS CF-POLL frame). These periods may be an interval of any length provided that: $13^{th}$ Period>$12^{th}$ Period>$11^{th}$ Period, $3^{rd}$ Period>$2^{nd}$ Period>$1^{st}$ Period, or $8^{th}$ Period>$7^{th}$ Period>$6^{th}$ Period.

Further, an SIFS is defined as a period of time (the fifteenth, fifth, or tenth period) in which the communication device with a voluntary transmission right retransmits a voluntary transmission right transfer frame after the communication device determines that an acknowledgement frame has not been transmitted for the voluntary transmission right transfer frame. A PIFS is defined as a period of time (the fourteenth, fourth, or ninth period) in which the device to which a voluntary transmission right is to be transferred determines whether a voluntary transmission right transfer frame has been retransmitted after the device transmitted an acknowledgement frame. These periods may be an interval of any length provided that: $13^{th}$ Period>$14^{th}$ Period>$15^{th}$ Period, $3^{rd}$ Period>$4^{th}$ Period>$5^{th}$ Period, or $8^{th}$ Period>$9^{th}$ Period>$10^{th}$ Period.

(Operations and Effects of the Present Invention)

As described above, a communication management method in accordance with the present invention is a communication management method for a communication system in which a plurality of communication devices are connected via a communication network to a central management device for managing grant of a voluntary transmission right to the plurality of communication devices, including the step of: one of the communication devices having been granted the voluntary transmission right by the central management device, transmitting a transmission right return frame to the central management device to voluntarily return the voluntary transmission right to the central management device.

Further, a communication management method in accordance with the present invention may be such that in the above method, the communication device as a transmitting station transmits the transmission right return frame without being error-correction coding.

According to this method, the central management device having received a transmission right return frame can identify that a received frame is a transmission return frame, without decoding the error-correction coded frame. Therefore, in the central management device, it is possible to shorten the length of a period from when the frame is received and when the received frame is identified to be the transmission right return frame, and to initiate frame transmission as the subsequent action without losing the voluntary transmission right to another communication device.

Still further a communication method in accordance with the present invention may be such that the central management device always returns an acknowledgement frame to the communication device in a predetermined first period after reception of the transmission right return frame from the communication device.

According to this method, the communication device having transmitted the transmission right return frame always receives the acknowledgement frame, so that the communication device can reliably verify that the transmission right return frame has been accurately received by the central management device. Therefore, for example, when the communication device cannot verify that the transmission right return frame has been accurately received by the central management device, the communication device can take some measures such as retransmission of the transmission right return frame, for example, thus ensuring return process of the voluntary transmission right.

Yet further, a communication management method in accordance with the present invention may be such that the communication device retransmits the transmission right return frame if the communication device does not receive the acknowledgement frame in response to the transmission right return frame in a second period, longer than the first period, after the transmission of the transmission right return frame.

If the communication device with the voluntary transmission right can receive the acknowledgement frame after transmitting the transmission right return frame, the transmission right return frame is not retransmitted because it can be said that the central management device has accurately received the transmission right return frame, that is, the communication device's intention to return the transmission right has been made known to the central management device.

In the case where the communication device with the voluntary transmission right cannot receive the acknowledgement frame in a period of time during which the central management device is expected to transmit the acknowledgement frame after the transmission of the transmission right return frame, there are the following possible two reasons.

The first reason is that even though the central management device accurately receives the transmission right return frame and returns the acknowledgement frame, the communication device with the voluntary transmission right fails to receive the acknowledgement frame in response to the transmission right return frame for some reason. The second reason is that since the central management device fails to accurately receive the transmission right return frame for some reason, the central management device does not return the acknowledgement frame.

In the case of the second reason, while the communication device with the voluntary transmission right recognizes that the transmission right has been returned because the communication device has transmitted the transmission right return frame, the central management device recognizes that the transmission right has been not returned yet because the central management device has failed to receive the transmission right return frame. In this case, there occurs a period of time during which no frame transmission is made from any communication devices, thus decreasing the efficiency of bandwidth use.

In contrast, according to the above method, if the communication device with the voluntary transmission right, after transmitting the transmission right return frame, cannot receive the acknowledgement frame in a period of time during which the central management device is expected to transmit the acknowledgement frame, the communication device retransmits the transmission right return frame. Therefore, the communication device with the voluntary transmission right retransmits the transmission right return frame until the central management device can accurately receive the transmission right return frame. This allows the central management device to reliably receive the transmission right return frame, thus enabling the completion of return process of the transmission right.

Further, a communication management method in accordance with the present invention may be such that when having detected no frame transmission from any communication device over a communication network for longer than a predetermined third period, the communication device is endowed with a right of obtaining the voluntary transmission right; and at the retransmission of the transmission right return frame, the communication device with the voluntary transmission right retransmits the transmission right return frame in the third period after last frame transmission or frame reception.

According to the above method, if no frame transmission is made from any communication devices over the network for a period of time which is more than the third period (corresponding to the DIFS in the above embodiment), all of the communication devices connecting to this communication network can attempt to obtain the voluntary transmission right. That is, if the communication device with the voluntary transmission right does not perform frame transmission for a period of time of more than the third period for some reason, the communication device would lose the voluntary transmission right to another communication device even when the communication device intends to keep holding the voluntary transmission right.

During the return process of the voluntary transmission right, in the case where a time interval of the frame transmission from when the communication device with the voluntary transmission right transmits the transmission right return frame to when the transmission right return frame is retransmitted due to a failed reception of the acknowledgement frame or other reason becomes more than the third period, there occurs the possibility that the voluntary transmission right would be lost to another communication device, and there may be the case where the communication device fails to appropriately complete the retransmission of the transmission right return frame because of another communication device's interruption for its frame transmission.

In contrast, according to the above method, when the communication device having the voluntary transmission right retransmits the transmission right return frame due to a failed reception of the acknowledgement frame, a failed identification of a type of a frame received, or other reason, the transmission right return frame is retransmitted in the third period after the last frame transmission or frame reception. This eliminates that a period of time during which no frame transmission is made from any communication devices for more than the third period during the return process of the voluntary transmission right, thus ensuring the retransmission for the transmission right return frame without another communication device's interruption for its transmission.

Still further, a communication management method in accordance with the present invention may be such that the central management device transmits to one of the communication devices a transmission right grant frame containing a transmission right grant duration indicating a grant duration of the voluntary transmission right, so as to grant the voluntary transmission right to the communication device; and the central management device avoids voluntarily initiating frame transmission in a period of time from when the transmission of the transmission right grant frame is completed to when the transmission right grant duration expires, or in a period of time from when the acknowledgement frame is transmitted in response to the transmission right return frame to when the central management device detects no wireless signal transmission from any of the communication devices in a predetermined fourth period.

If the communication device having transmitted the transmission right return frame fails to receive, for some reason, the acknowledgement frame which the central management device has transmitted in response to the transmission right return frame, the transmission right return frame is supposed to be retransmitted. At this point, if the central management device voluntarily initiates frame transmission immediately after the transmission of the acknowledgement frame, the retransmission of the transmission right return frame and the voluntary frame transmission by the central management device are performed simultaneously, so that there is the possibility that a drawback including interference of both frames on the network occurs.

In contrast, according to the above method, the drawback as described above does not occur because the central management device, before initiating its frame transmission, verifies that no frame transmission is initiated from any other communications at the point in time when the predetermined fourth period expires, in accordance with a prediction that the transmission right return frame may be retransmitted after the transmission of the acknowledgement frame in response to the transmission right return frame.

Yet further, a communication management method in accordance with the present invention may be such that the central management device voluntarily initiates frame transmission in the third period after the transmission of the acknowledgement frame in response to the transmission right return frame.

In the case where the central management device waits for a given period of time without initiating transmission in accordance with a prediction that the transmission right return frame may be retransmitted, waiting for a period of time longer than the third period may cause unexpected loss of the voluntary transmission right to another communication device detecting that the wireless medium is idle for a period of time of more than the third period. In this case, there occurs a drawback including disturbance of the voluntary transmission right granting scheduling by the central management device.

In contrast, according to the above method, the drawback as described above does not occur because the central management device voluntarily initiates frame transmission in the third period.

Further, a communication management method in accordance with the present invention may be such that if the communication device having transmitted the transmission right return frame cannot identify a type of a frame received immediately after the transmission of the transmission right return frame, or if the received frame is not the acknowledgement frame in response to the transmission right return frame having been transmitted previously, the communication device retransmits the transmission right return frame in a fifth period, shorter than the fourth period, which is a period of time from when the received frame is received to when the central management device voluntarily initiates frame transmission.

When, in spite of the transmission of the acknowledgement frame by the central management device in response to the transmission right return frame, the communication device having transmitted the transmission right return frame fails to identify the type of the frame transmitted by the central management device for some reason, the central management device recognizes that the transmission right has been returned while the communication device having transmitted the transmission right return frame cannot recognize that return of the transmission right has been completed and retransmits the transmission right return frame. In this case, frame transmission by the communication device having transmitted the transmission right return frame and frame transmission by the central management device are performed simultaneously, thus causing interference of both frames on the network. There is the possibility that this state would last until the communication device judges the expiry of the duration during which the voluntary transmission right is granted.

In contrast, according to the above method, in such a situation, the communication device having transmitted the transmission right return frame retransmits the transmission right return frame before expiry of the fifth period during which the central management device is expected to initiate voluntary frame transmission. Therefore, the drawback as described above does not occur if the central management device, before initiating the voluntary frame transmission, verifies that other device is performing frame transmission and performs the operation such as cancellation of the voluntary frame transmission.

Still further, a communication management method in accordance with the present invention is a communication management method for a communication system in which a plurality of communication devices are connected via a communication network to a central management device for managing grant of a voluntary transmission right to the plurality of communication devices, and only the communication device granted the voluntary transmission right can perform frame transmission, including the steps of: the central management device transmitting a transmission right grant frame to one of the communication devices, so as to grant the voluntary transmission right to the communication device; and the communication device having received the transmission right grant frame always returning an acknowledgement frame to the central management device in a predetermined sixth period after the reception of the transmission right grant frame from the central management device.

Yet further, a communication management method in accordance with the present invention may be such that the central management device retransmits the transmission right grant frame if the central management device does not receive the acknowledgement frame in response to the transmission right grant frame in a seventh period, longer than the sixth period, after the transmission right grant frame is transmitted.

If the central management device receives the acknowledgement frame after transmitting the transmission right grant frame, the transmission right grant frame is not retransmitted because it can be said that the communication device has accurately received the transmission right grant frame, that is, the central management device's intention to grant the transmission right has been made known to the communication device.

In the case where the central management device fails to receive the acknowledgement frame in a period of time during which the communication device is expected to transmit the acknowledgement frame after the central management device transmits the transmission right grant frame, there are the following possible two reasons.

The first reason is that even though the communication device accurately receives the transmission right grant frame and returns the acknowledgement frame, the central management device fails to receive the acknowledgement frame in response to the transmission right grant frame for some reason. The second reason is that since the communication device fails to accurately receive the transmission right grant frame for some reason, the communication device does not return the acknowledgement frame.

In the case of the second reason, while the central management device recognizes that the transmission right has been granted because the central management device has transmitted the transmission right grant frame, the communication device recognizes that the transmission right has been not granted because the communication device has not received the transmission right grant frame. In this case, there occurs a period of time during which no frame transmission is made from any other communication devices, thus decreasing the efficiency of bandwidth use.

In contrast, according to the above method, if the central management device, after transmitting the transmission right grant frame, cannot receive the acknowledgement frame in a period of time during which the communication device is expected to transmit the acknowledgement frame, the central management device retransmits the transmission right grant frame. Therefore, the central management device retransmits the transmission right grant frame until the communication device can accurately receive the transmission right grant frame. This allows the communication device to reliably receive the transmission right grant frame, thus enabling decrease in the possibility of occurrence of a period of time during which no frame transmission is made from any communication devices. This increases the efficiency of bandwidth use.

Further, a communication management method in accordance with the present invention may be such that when having detected no frame transmission from any of the communication devices for longer than a predetermined eighth period, the communication device is endowed with a right of obtaining the voluntary transmission right; and the central management device retransmits the transmission right grant frame in the eighth period after the transmission of the transmission right grant frame.

According to the above method, if no frame transmission is made from any communication devices over the network for a period of time which is more than the eighth period (corresponding to the DIFS in the above embodiment), all of the communication devices connecting to this communication network can attempt to obtain the voluntary transmission right. That is, if the communication device with the voluntary transmission right does not perform frame transmission for a period of time of more than the eighth period for some reason, the communication device would lose the voluntary transmission right to another communication device even when the communication device intends to keep holding the voluntary transmission right.

During the grant process of the voluntary transmission right, in the case where a time interval of the frame transmission from when the central management device transmits the transmission right grant frame to when the transmission right grant frame is retransmitted due to a failed reception of the acknowledgement frame or other reason becomes more than the eighth period, there occurs the possibility that the voluntary transmission right would be lost to another communication device, and there may be the case where the communication device fails to appropriately complete the grant process of the transmission right because of another communication device's interruption for its frame transmission.

In contrast, according to the above method, when the central management device retransmits the transmission right grant frame due to a failed reception of the acknowledgement frame or other reason, the transmission right grant frame is retransmitted in the eighth period. This eliminates that a period of time during which no frame transmission is made from any communication devices for more than the eighth period during the grant process of the voluntary transmission right, thus ensuring the retransmission of the transmission right grant frame without another communication device's interruption for its transmission.

Yet further, a communication management method in accordance with the present invention may be such that the communication device having received the transmission right grant frame avoids voluntarily initiating frame transmission in a period of time from when the acknowledgement frame is transmitted in response to the transmission right grant frame to when the communication device detects no wireless signal transmission from any of the communication devices in a predetermined ninth period.

If the central management device fails to receive, for some reason, the acknowledgement frame which the communication device receiving the transmission right grant frame have transmitted in response to the transmission right grant frame, the transmission right grant frame is supposed to be retransmitted. At this point, if the communication device receiving the transmission right grant frame initiates frame transmission immediately after the transmission of the acknowledgement frame, the retransmission of the transmission right grant frame and the voluntary frame transmission by the communication device receiving the transmission right grant frame are performed simultaneously, so that there is the possibility that a drawback including interference of both frames on the network occurs.

In contrast, according to the above method, the drawback as described above does not occur because the communication device receiving the transmission right grant frame, before initiating its frame transmission, verifies that no frame transmission is initiated from any communication devices at the point in time when the predetermined ninth period is expired, in accordance with a prediction that the transmission right return frame may be retransmitted after the transmission of the acknowledgement frame in response to the transmission right grant frame.

Further, a communication management method in accordance with the present invention may be such that the communication device having received the transmission right grant frame voluntarily initiates frame transmission in the eighth period after the transmission of the acknowledgement frame in response to the transmission right grant frame.

In the case where the communication device receiving the transmission right grant frame waits for a given period of time without initiating transmission in accordance with a prediction that the transmission right grant frame may be retransmitted, waiting for a period of time longer than the eighth period may cause unexpected loss of the voluntary transmission right by another communication device detecting that the wireless medium is idle for a period of time of more than the eighth period. In this case, there occurs a drawback including disturbance of the voluntary transmission right granting scheduling by the central management device.

In contrast, according to the above method, the drawback as described above does not occur because the communication device receiving the transmission right grant frame voluntarily initiates frame transmission in the eighth period.

Yet further, a communication management method in accordance with the present invention may be such that if the central management device cannot identify a frame received immediately after the transmission of the transmission right grant frame, or if the received frame is not the acknowledgement frame in response to the transmission right grant frame having transmitted previously, the central management device retransmits the transmission right grant frame in a tenth period, longer than the ninth period, which is a period of time from when the received frame is received to when the communication device having received the transmission right grant frame voluntarily initiates frame transmission.

When, in spite of the transmission of the acknowledgement frame by the communication device receiving the transmission right grant frame in response to the transmission right grant frame, the central management device fails to identify a type of the frame transmitted by the communication device for some reason, the communication device receiving the transmission right grant frame recognizes that the transmission right has been granted while the central management device cannot recognize that the grant of the transmission right has been completed and retransmits the transmission right grant frame. In this case, frame transmission by the central management device and frame transmission by the communication device receiving the transmission right grant frame are performed simultaneously, thus causing interference of both frames on the network. There is the possibility that this state would last until the communication device receiving the transmission right grant frame judges the expiry of the duration during which the voluntary transmission right is granted.

In contrast, according to the above method, in such a situation, the central management device retransmits the transmission right grant frame before expiry of the ninth period during which the communication device receiving the transmission right grant frame is expected to initiate voluntary frame transmission. Therefore, the drawback as described above does not occur when the communication device receiving the transmission right grant frame, before initiating the voluntary frame transmission, verifies that other device is making frame transmission and performs the operation such as cancellation of the voluntary frame transmission.

Further, a communication management method in accordance with the present invention is a communication management method for use in a network system which allows only a communication device with a voluntary transmission right to initiate a frame exchange sequence and allows a communication device without the voluntary transmission right to transmit only a frame which is a response to a received frame, including the steps of: (a) allowing a communication device to obtain the voluntary transmission right, the communication device having detected no frame transmission from any communication device over a communication network for longer than a thirteenth period; (b) to transfer the voluntary transmission right to another communication device, the communication device with the voluntary transmission right transmitting a voluntary transmission right transfer frame to the other communication device which is a transfer destination of the voluntary transmission right; (c) the other communication device receiving the voluntary transmission right transfer frame, transmitting an acknowledgement frame to the communication device which is a transmitting end of the voluntary transmission right transfer frame after an eleventh period following the reception of the voluntary transmission right transfer frame; and (d) when having detected no frame transmission from any other communication device over the communication network in a twelfth period after the transmission of the voluntary transmission right transfer frame, the communication device having transmitted the voluntary transmission right transfer frame, retransmitting the voluntary transmission right transfer frame in the thirteenth period after the transmission of the voluntary transmission right transfer frame, wherein: the thirteenth period, the eleventh period, and the twelfth period satisfy the following relation: the thirteenth period>the twelfth period>the eleventh period.

According to the above method, if no frame transmission is performed over the network for a period of time which is more than the thirteenth period, all of the communication devices connecting to this communication network can attempt to obtain the voluntary transmission right. That is, if the communication device having the voluntary transmission right does not perform frame transmission for a period of time of more than the thirteenth period for some reason, the communication device would lose the voluntary transmission right to another communication device even when the communication device does not intend to transfer the voluntary transmission right. This is aimed at the grant of the voluntary transmission right to a communication device not explicitly requiring the voluntary transmission right for the purpose of transmission of low priority data and data not having the necessity of being transmitted periodically.

Further, if the communication device with the voluntary transmission right is to transfer the voluntary transmission right to a particular communication device, the communication device with the voluntary transmission right transmits the voluntary transmission right transfer frame to the communication device which is a transfer destination. That is, the communication device with the voluntary transmission right can specify the transfer destination of the voluntary transmission right. This enables management of the voluntary transmission right over the communication network, thus allowing for transmission scheduling with high use efficiency.

Still further, the communication device having received the voluntary transmission right transfer frame transmits the acknowledgement frame to the communication device which is a transmitting end of the voluntary transmission right transfer frame after the eleventh period following the reception of the voluntary transmission right transfer frame. Here, the eleventh period is set to be shorter than the thirteenth period. Therefore, the communication device having received the voluntary transmission right transfer frame can transfer the acknowledgement frame after the reception of the voluntary transmission right transfer frame, without losing the voluntary transmission right to another communication device.

However, in the communication network with low reliability communication medium, such as a wireless communication network, for example, it is considered that the voluntary transmission right transfer frame does not accurately reach to the communication device which is a transfer destination of the voluntary transmission right. In this case, the communication device which is a transfer destination of the voluntary transmission right does not realize that the voluntary transmission right has been granted to itself, so that the communication device does not initiate frame transmission. Then, a period of no frame transmission exceeds the thirteenth period, thus raising the possibility that a communication device other than the communication device which is a transfer destination of the voluntary transmission right would obtain the voluntary transmission right. This disables the transmission sequence according to a transmission schedule and raises the possibility of decrease in use efficiency of the communication network.

In contrast, according to the above method, when having detected no frame transmission from any other communication device over the communication network in a twelfth period after the transmission of the voluntary transmission right transfer frame, the communication device having transmitted the voluntary transmission right transfer frame retransmits the voluntary transmission right transfer frame in the thirteenth period after the transmission of the voluntary transmission right transfer frame. Here, the twelfth period is shorter than the thirteenth period and longer than the eleventh period.

When the voluntary transmission right transfer frame has been accurately transmitted to the communication device which is a transfer destination of the voluntary transmission right, the acknowledgement frame is transmitted after the eleventh period, which is shorter than the twelfth period, so that frame transmission is performed over the communication network in the twelfth period. That is, the communication device having transmitted the voluntary transmission right transfer frame can verify that the voluntary transmission right has been accurately transferred, so that the communication does not retransmit the voluntary transmission right transfer frame.

On the other hand, when the voluntary transmission right transfer frame has not been accurately transmitted to the communication device which is a transfer destination of the voluntary transmission right, the acknowledgement frame is not transmitted, so that frame transmission is not performed over the communication network in the twelfth period. In addition, there is no frame transmission from any other communication device in the twelfth period, which is shorter than the thirteenth period. Therefore, the communication device having transmitted the voluntary transmission right transfer frame can verify a failed transfer of the voluntary transmission right, so that the communication device retransmits the voluntary transmission right transfer frame in the thirteenth period. Here, since the voluntary transmission right transfer frame is retransmitted in the thirteenth period, the voluntary transmission right is lost to another communication device.

Therefore, the method as described above, since it is possible to surely transfer the voluntary transmission right to the communication device which is a transfer destination of the voluntary transmission right, it is also possible to accurately manage the voluntary transmission right over the communication network with low reliable communication medium. Therefore, for example, for a wireless communication network in which realtime data such as video data are transmitted and received, it is possible to construct a communication network realizing a comfortable communication without a trouble such as interrupted display Further, a communication management method in accordance with the present invention may be such that is the above method, when having detected no frame transmission from any other communication device over the communication network in a fourteenth period after the transmission of the acknowledgement frame, the communication device receiving the voluntary transmission right transfer frame recognizes that the voluntary transmission right is transferred to itself; and on the other hand, when having detected frame transmission from any other communication device over the communication network in the fourteenth period after the transmission of the acknowledgement frame, the communication device receiving the voluntary transmission right transfer frame recognizes that the voluntary transmission right is not transferred to itself; and the thirteenth period and the fourteenth period satisfy the following relation: the thirteenth period>the fourteenth period.

After the transmission of the acknowledgement frame by the communication device receiving the voluntary transmission right transfer frame, if the acknowledgement frame is accurately received by the communication device having transmitted the voluntary transmission right transfer frame, data transmission is not made over the communication network in the fourteenth period which is shorter than the thirteenth period. On the other hand, if the acknowledgement frame is not accurately received by the communication device having transmitted the voluntary transmission right transfer frame, the voluntary transmission right transfer frame is retransmitted in the thirteenth period, as described above. Therefore, according to the above method, even in the case of a failed transmission and reception of the acknowledgement frame, it is possible to surely transfer the voluntary transmission right without unexpectedly losing the voluntary transmission right to another communication device.

Yet further, a communication management method in accordance with the present invention may be such that in the above method, when having detected no frame transmission from any other communication device over the communication network in a twelfth period after the transmission of the voluntary transmission right transfer frame, if judging that the frame transmitted by any other communication device cannot be identified or is not the acknowledgement frame, the communication device having transmitted the voluntary transmission right transfer frame retransmits the voluntary transmission right transfer frame in a fifteenth period after the transmission of the frame by any other communication device; and the thirteenth period and the fifteenth period satisfy the following relation: the thirteenth period>the fifteenth period.

Frame transmission made over the communication network in the twelfth period after the transmission of the voluntary transmission right transfer frame indicates either transmission of the acknowledgement frame or noise and unscheduled frame transmission. Here, the transmission of the acknowledgement frame, which indicates that the voluntary transmission right has been accurately transferred, is not a matter. However, the transmission of noise and unscheduled frame indicates that the voluntary transmission right has not been accurately transferred. In view of this, in the above method, when noise and unscheduled frame transmission is made, the voluntary transmission right transfer frame is retransmitted in the fifteenth period which is shorter than the thirteenth period. This ensures the transfer of the voluntary transmission right.

Still further, a communication management method in accordance with the present invention may be such that in the above method, the fourteenth period is equal to the twelfth period, and the fifteenth period is equal to the eleventh period.

According to the above method, there are three types of periods to be actually managed, thus facilitating the simplification of a period management process.

Further, a communication management method in accordance with the present invention may be such that in the above method, a communication device, other than the communication device which is a transmitting end of the voluntary right transfer frame and the communication device which is a receiving end of the voluntary right transfer frame, avoids frame transmission in a voluntary transmission right transfer period which is contained in the voluntary transmission right transfer frame.

Conventionally, when having received the voluntary transmission right transfer frame, a communication device, other than the communication device which is a transmitting end of the voluntary transmission right transfer frame and the communication device which is a receiving end of the voluntary right transfer frame, makes an attempt at obtaining the voluntary transmission right if no signal is sent out from any communication device for longer than the thirteenth period after the reception of the voluntary transmission right transfer frame. Therefore, in some cases, it is considered that a communication device other than the communication device which is a receiving end of the voluntary transmission right transfer frame obtains the voluntary transmission right, and there is the possibility that a transmission sequence would not be performed according to the transmission schedule.

In contrast, according to the above method, when having received the voluntary transmission right transfer frame, the communication device which is a transmitting end of the voluntary transmission right transfer frame and the communication device which is a receiving end of the voluntary right transfer frame checks the voluntary transmission right transfer period contained in the voluntary transmission right transfer frame and avoids frame transmission in this period. Therefore, it is possible to prevent the communication device other than the communication device which is a receiving end of the voluntary transmission right transfer frame from obtaining the voluntary transmission right, thus allowing for the realization of a transmission sequence according to a transmission schedule.

Still further, a communication management method in accordance with the present invention may be such that in the above method, when the communication device, having received the voluntary transmission right transfer frame and obtained the voluntary transmission right, has no scheduled frame transmission and no scheduled further transfer of the voluntary transmission right, the communication device transmits a frame to allow all communication devices connected to the communication network to make an attempt at obtaining the voluntary transmission right.

In the aforementioned method, when having received the voluntary transmission right transfer frame, the communication device other than the communication device which is a transmitting end of the voluntary transmission right transfer frame and the communication device which is a receiving end of the voluntary right transfer frame checks the voluntary transmission right transfer period contained in the voluntary transmission right transfer frame and avoids frame transmission in this period. In this case, however, if the communication device having obtained the voluntary transmission right has no scheduled transmission and no scheduled further transfer of the voluntary transmission right, neither the communication device having obtained the voluntary transmission right nor other communication device makes frame transmission. That is the communication network unnecessarily becomes idle.

In contrast, according to the above method, when the communication device having obtained the voluntary transmission right has no scheduled frame transmission and no scheduled further transfer of the voluntary transmission right, the communication device transmits a frame to allow all communication devices connected to the communication network to make an attempt at obtaining the voluntary transmission right, thus enabling an effective use of the communication bandwidth.

Yet further, a communication management method in accordance with the present invention may be such that in the above method, the thirteenth period is DIFS in ANSI/IEEE Std 802.11, 1999 Edition, the eleventh and fifteenth periods are SIFS in ANSI/IEEE Std 802.11, 1999 Edition, and the twelfth and fourteenth periods are PIFS in ANSI/IEEE Std 802.11, 1999 Edition.

According to the above method, the above periods can be realized by the periods standardized in the ANSI/IEEE Std 802.11, 1999 Edition, thus eliminating the need for provision of new standard for a period. Therefore, it is possible to readily introduce the communication management method in accordance with the present invention.

Further, a communication management method in accordance with the present invention may be such that in the above method, the communication network includes thereon a central management device for managing a transmission schedule in the communication network; the communication device which is a receiving end of the voluntary transmission right transfer frame is the central management device; and the voluntary transmission right transfer frame is a frame indicating expiry of a grant duration of the voluntary transmission right.

According to the above method, to the central management device for managing the transmission schedule in the communication network, the frame indicating expiry of a grant duration of the voluntary transmission right is transmitted accurately. Therefore, it is possible to accurately realize the transmission schedule without unexpected frame transmission to the central management device.

Still further, a communication management method in accordance with the present invention may be such that in the above method, the communication network includes thereon a central management device for managing a transmission schedule in the communication network; the communication device which is a transmitting end of the voluntary transmission right transfer frame is the central management device; and the voluntary transmission right transfer frame is a frame indicating grant of the voluntary transmission right.

According to the above method, it is possible for the central management device for managing the transmission schedule in the communication network to ensure transmission of the voluntary transmission right to a predetermined communication device according to the transmission schedule.

Further, a communication management program in accordance with the present invention causes a computer to execute the communication management method.

By loading the above program in a computer system, it is possible to provide a user with the above communication management method.

Still further, a recording medium storing a communication management program in accordance with the present invention stores a communication management program which causes a computer to execute the communication management program.

By loading the program stored in the recording medium in the computer system, it is possible to provide a user with the above communication management method.

CONCLUSION

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The communication management method in accordance with the present invention can be preferably used in network systems such as a home-use LAN connecting home electric appliances having a built-in wireless communication function. More specifically, the communication management method can be applied to a system in which a video data output apparatus such as DVD player and modem for cable television, and a display apparatus for displaying video image in accordance with such video data.

The invention claimed is:

1. A communication management method for a communication system in which a plurality of communication devices are connected via a communication network to a central management device for managing grant of a voluntary transmission right to the plurality of communication devices, the communication system providing a predetermined first period, a predetermined second period, and a predetermined third period, the predetermined first period being shorter than the predetermined second period and the predetermined third period, the method comprising:
 determining one of the communication devices has been granted the voluntary transmission right by the central management device; and
 transmitting a transmission right return frame from the one communication device determined as having been granted the voluntary transmission right to the central management device to voluntarily return the voluntary transmission right to the central management device;
 when the communication device having detected no frame transmission from any of the communication devices over a communication network for longer than the predetermined third period, the communication device being endowed with a right of obtaining the voluntary transmission right; and
 the communication device with the voluntary transmission right, transmitting the transmission right return frame after the predetermined first period, which is shorter than the predetermined third period, following completion of transmission of last frame.

2. The communication management method according to claim 1, wherein:
 the communication device as a transmitting station transmits the transmission right return frame without performing error-correction coding.

3. The communication management method according to claim 1, wherein:
 the central management device always returns an acknowledgement frame to the communication device in the predetermined first period after reception of the transmission right return frame from the communication device.

4. The communication management method according to claim 3, wherein:
 the communication device retransmits the transmission right return frame if the communication device does not receive the acknowledgement frame in response to the transmission right return frame in the predetermined second period, longer than the predetermined first period, after the transmission of the transmission right return frame.

5. The communication management method according to claim 4, wherein:
 when having detected no frame transmission from any of the communication devices over a communication network for longer than the predetermined third period, the communication device is endowed with a right of obtaining the voluntary transmission right; and
 the communication device with the voluntary transmission right retransmits the transmission right return frame in the predetermined third period after last frame transmission or frame reception.

6. The communication management method according to claim 5, wherein:
 the central management device transmits to one of the communication devices a transmission right grant frame containing a transmission right grant duration indicating a grant duration of the voluntary transmission right, so as to grant the voluntary transmission right to the communication device; and
 the central management device avoids voluntarily initiating frame transmission in a period of time from when the transmission of the transmission right grant frame is completed to when the transmission right grant duration expires, or in a period of time from when the acknowledgement frame is transmitted in response to the transmission right return frame to when the central management device detects no wireless signal transmission from any of the communication devices in a predetermined fourth period.

7. The communication management method according to claim 5, wherein:
 the central management device transmits the transmission right grant frame or data frame which needs to be transmitted to another communication device when the transmission right grant duration expires after transmission of a transmission right grant frame or when the central management device have detected no wireless signal transmission from any of the communication devices in a predetermined fourth period after the transmission of the acknowledgement frame in response to the transmission right return frame.

8. The communication management method according to claim 6 or 7, wherein:
 the central management device voluntarily initiates frame transmission in the predetermined third period after the transmission of the acknowledgement frame in response to the transmission right return frame.

9. The communication management method according to claim 6 or 7, wherein:
 if the communication device having transmitted the transmission right return frame cannot identify a type of a frame received immediately after the transmission of the transmission right return frame, or if the received frame is not the acknowledgement frame in response to the transmission right return frame having been transmitted previously, the communication device retransmits the transmission right return frame in a predetermined fifth period, shorter than the predetermined fourth period which is a period of time from when the received frame is received to when the central management device voluntarily initiates frame transmission.

10. A communication management method for a communication system in which a plurality of communication devices are connected via a communication network to a central management device for managing grant of a voluntary transmission right to the plurality of communication devices, the communication system providing a predetermined first period, a predetermined second period, and a predetermined third period, the predetermined first period being shorter than the predetermined second period and the predetermined third period, the method comprising:

the central management device transmitting a transmission right grant frame to one of the communication devices, so as to grant the voluntary transmission right to the communication device;

when having detected no frame transmission from any of the communication devices for longer than the predetermined third period, the communication device is endowed with a right of obtaining the voluntary transmission right; and the communication device having received the transmission right grant frame always returning an acknowledgement frame to the central management device in the predetermined first period which is shorter than the predetermined third period after the reception of the transmission right grant frame from the central management device.

11. The communication management method according to claim 10, wherein:

the central management device retransmits the transmission right grant frame if the central management device does not receive the acknowledgement frame in response to the transmission right grant frame in the predetermined second period, longer than the predetermined first period, after the transmission right grant frame is transmitted.

12. The communication management method according to claim 11, wherein:

when having detected no frame transmission from any of the communication devices for longer than the predetermined third period, the communication device is endowed with a right of obtaining the voluntary transmission right; and the central management device retransmits the transmission right grant frame in the predetermined third period after last frame transmission or frame reception.

13. The communication management method according to claim 12, wherein:

the communication device having granted the voluntary transmission right avoids voluntarily initiating frame transmission in a period of time from when the acknowledgement frame is transmitted in response to the transmission right grant frame to when the communication device detects no wireless signal transmission from any of the communication devices in a predetermined fourth period.

14. The communication management method according to claim 12, wherein:

the communication device having granted the voluntary transmission right transmits the transmission right return frame or data frame which needs to be transmitted to another communication device when the communication device detects no wireless signal transmission from any of the communication devices in a predetermined fourth period after the transmission of the acknowledgement frame in response to the transmission right grant frame.

15. The communication management method according to claim 13 or 14, wherein:

the communication device having granted the voluntary transmission right voluntarily initiates frame transmission in the predetermined third period after the transmission of the acknowledgement frame in response to the transmission right grant frame.

16. The communication management method according to claim 13 or 14, wherein:

if the central management device cannot identify a type of a frame received immediately after the transmission of the transmission right grant frame, or if the received frame is not the acknowledgement frame in response to the transmission right grant frame having transmitted previously, the central management device retransmits the transmission right grant frame in a fifth period which is a period of time from when the received frame is received to when the communication device having granted the voluntary transmission right voluntarily initiates frame transmission.

17. The communication management method according to claim 1, wherein:

the central management device, after having received the transmission right return frame from the communication device having granted the voluntary transmission right, transmits to the plurality of communication devices a free-transmission allowance frame to grant a right of obtaining the voluntary transmission right.

18. The communication management method according to claim 17, wherein:

the central management device, after having received the transmission right return frame from the communication device having granted the voluntary transmission right, transmits the free-transmission allowance frame only when the central management device has no further frame transmission.

19. A communication management method for use in a network system which allows only a communication device with a voluntary transmission right to initiate a frame exchange sequence and allows a communication device without the voluntary transmission right to transmit only a frame which is a response to a received frame, the method comprising:

allowing a communication device to obtain the voluntary transmission right, the communication device having detected no frame transmission from any communication device over a communication network for longer than a first period;

to transfer the voluntary transmission right to another communication device, the communication device with the voluntary transmission right transmitting a voluntary transmission right transfer frame to the other communication device which is a transfer destination of the voluntary transmission right;

the other communication device receiving the voluntary transmission right transfer frame, transmitting an acknowledgement frame to the communication device which is a transmitting end of the voluntary transmission right transfer frame after a second period following the reception of the voluntary transmission right transfer frame; and when having detected no frame transmission from any other communication device over the communication network in a third period after the transmission of the voluntary transmission right transfer frame, the communication device having transmitted the voluntary transmission right transfer frame, retransmitting the voluntary transmission right transfer frame in the first period after the transmission of the voluntary transmission right transfer frame, wherein:

the first period, the second period, and the third period satisfy the following relation:

the first period>the third period>the second period.

20. The communication management method according to claim 19, wherein:

when having detected no frame transmission from any other communication device over the communication network in a fourth period after the transmission of the acknowledgement frame, the communication device receiving the voluntary transmission right transfer frame recognizes that the voluntary transmission right is transferred to itself, and on the other hand, when having detected frame transmission from any other communication device over the communication network in the fourth period after the transmission of the acknowledgement frame, the communication device receiving the voluntary transmission right transfer frame recognizes that the voluntary transmission right is not transferred to itself; and the first period and the fourth period satisfy the following relation:

the first period>the fourth period.

21. The communication management method according to claim 20, wherein:

when having detected no frame transmission from any other communication device over the communication network in a third period after the transmission of the voluntary transmission right transfer frame, if judging that the frame transmitted by any other communication device cannot be identified or is not the acknowledgement frame, the communication device having transmitted the voluntary transmission right transfer frame retransmits the voluntary transmission right transfer frame in a fifth period after the transmission of the frame by any other communication device; and the first period and the fifth period satisfy the following relation:

the first period>the fifth period.

22. The communication management method according to claim 21, wherein:

the fourth period is equal to the third period, and the fifth period is equal to the second period.

23. The communication management method according to any one of claims 19 through 22, wherein:

a communication device, other than the communication device which is a transmitting end of the voluntary right transfer frame and the communication device which is a receiving end of the voluntary right transfer frame, avoids frame transmission in a voluntary transmission right transfer period which is contained in the voluntary transmission right transfer frame.

24. The communication management method according to claim 23, wherein:

when the communication device, having received the voluntary transmission right transfer frame and obtained the voluntary transmission right, has no scheduled frame transmission and no scheduled further transfer of the voluntary transmission right, the communication device transmits a frame to allow all communication devices connected to the communication network to make an attempt at obtaining the voluntary transmission right.

25. The communication management method according to claim 21, wherein:

the first period is DIFS in ANSI/IEEE Std 802.11, 1999 Edition;

the second and fifth periods are SIFS in ANSI/IEEE Std 802.11, 1999 Edition; and the third and fourth periods are PIFS in ANSI/IEEE Std 802.11, 1999 Edition.

26. The communication management method according to claim 19, wherein:

the communication network includes thereon a central management device for managing a transmission schedule in the communication network;

the communication device, a receiving end of the voluntary transmission right transfer frame, is the central management device; and the voluntary transmission right transfer frame is a frame indicating expiry of a grant duration of the voluntary transmission right.

27. The communication management method according to claim 19, wherein:

the communication network includes thereon a central management device for managing a transmission schedule in the communication network;

the communication device which is a transmitting end of the voluntary transmission right transfer frame is the central management device; and the voluntary transmission right transfer frame is a frame indicating grant of the voluntary transmission right.

28. A communication management apparatus, the apparatus providing a predetermined first period, a predetermined second period, and a predetermined third period, the predetermined first period being shorter than the predetermined third period, comprising:

a memory storing a set of instructions; and a processor to execute the stored set of instructions to perform the method comprising:

determining one of the communication devices has been granted the voluntary transmission right by the central management device; and transmitting a transmission right return frame from the one communication device determined as having been granted the voluntary transmission right to the central management device to voluntarily return the voluntary transmission right to the central management device;

when the communication device having detected no frame transmission from any of the communication devices over a communication network for longer than the predetermined third period, the communication device being endowed with a right of obtaining the voluntary transmission right; and the communication device with the voluntary transmission right, transmitting the transmission right return frame after the predetermined first period, which is shorter than the predetermined third period, following completion of transmission of last frame.

29. A non-transitory computer readable medium containing instructions, executed by a processor, for performing a method for a communication system in which a plurality of communication devices are connected by a communication network to a central management device for managing grant of a voluntary transmission right to the plurality of communication devices, the communication system providing a predetermined first period, a predetermined second period, and a predetermined third period, the predetermined first period being shorter than the predetermined third period, the method comprising:

determining one of the communication devices has been granted the voluntary transmission right by the central management device; and transmitting a transmission right return frame from the one communication device determined as having been granted the voluntary transmission right to the central management device to voluntarily return the voluntary transmission right to the central management device;

when the communication device having detected no frame transmission from any of the communication devices over a communication network for longer than the predetermined third period, the communication device being endowed with a right of obtaining the voluntary transmission right; and the communication device with the voluntary transmission right, transmitting the transmission right return frame after the predetermined first period, which is shorter than the predetermined third period, following completion of transmission of last frame.

30. A central management device operating in a communication system in which a plurality of communication devices are connected by a communication network to the central management device for managing grant of a voluntary transmission right to the plurality of communication devices, the communication system providing a predetermined first period, a predetermined second period, and a predetermined third period, the predetermined first period being shorter than the predetermined third period, the central management device comprising:

a determination module for determining one of the communication devices has been granted the voluntary transmission right by the central management device; and a receiver for receiving a transmission right return frame from the one of the communication devices determined as having been granted the voluntary transmission right to the central management device to voluntarily return the voluntary transmission right to the central management device;

when the communication device having detected no frame transmission from any of the communication devices over a communication network for longer than the predetermined third period, the communication device being endowed with a right of obtaining the voluntary transmission right; and the communication device with the voluntary transmission right, transmitting the transmission right return frame after the predetermined first period, which is shorter than the predetermined third period, following completion of transmission of last frame.

31. A central management device, comprising:
a memory, storing a set of instructions; and
a processor, executing the stored set of instructions, to perform the method for a communication system in which a plurality of communication devices are connected via a communication network to the central management device for managing grant of a voluntary transmission right to the plurality of communication devices, the communication system providing a predetermined first period, a predetermined second period, and a predetermined third period, the predetermined first period being shorter than the predetermined third period, the method comprising:
the central management device transmitting a transmission right grant frame to one of the communication devices, so as to grant the voluntary transmission right to the communication device; when having detected no frame transmission from any of the communication devices for longer than the predetermined third period, the communication device is endowed with a right of obtaining the voluntary transmission right; and the communication device having received the transmission right grant frame always returning an acknowledgement frame to the central management device in the predetermined first period which is shorter than the predetermined third period after the reception of the transmission right grant frame from the central management device.

32. A non-transitory computer readable medium containing instructions, executed by a processor, for performing a method for a communication system in which a plurality of communication devices are connected via a communication network to a central management device for managing grant of a voluntary transmission right to the plurality of communication devices, the communication system providing a predetermined first period, a predetermined second period, and a predetermined third period, the predetermined first period being shorter than the predetermined third period, the method comprising:
the central management device transmitting a transmission right grant frame to one of the communication devices, so as to grant the voluntary transmission right to the communication device;

when having detected no frame transmission from any of the communication devices for longer than the predetermined third period, the communication device is endowed with a right of obtaining the voluntary transmission right; and the communication device having received the transmission right grant frame always returning an acknowledgement frame to the central management device in the predetermined first period which is shorter than the predetermined third period after the reception of the transmission right grant frame from the central management device.

33. A communication device comprising:
a memory, storing a set of instructions; and
a processor, executing the stored set of instructions, to perform the method comprising:

allowing a communication device to obtain the voluntary transmission right, the communication device having detected no frame transmission from any communication device over a communication network for longer than a first period;

to transfer the voluntary transmission right to another communication device, the communication device with the voluntary transmission right transmitting a voluntary transmission right transfer frame to the other communication device which is a transfer destination of the voluntary transmission right;

the other communication device receiving the voluntary transmission right transfer frame, transmitting an acknowledgement frame to the communication device which is a transmitting end of the voluntary transmission right transfer frame after a second period following the reception of the voluntary transmission right transfer frame; and when having detected no frame transmission from any other communication device over the communication network in a third period after the transmission of the voluntary transmission right transfer frame, the communication device having transmitted the voluntary transmission right transfer frame, retransmitting the voluntary transmission right transfer frame in the first period after the transmission of the voluntary transmission right transfer frame, wherein:
the first period, the second period, and the third period satisfy the following relation:
the first period>the third period>the second period.

34. A non-transitory computer readable medium containing instructions, executed by a processor, for performing the method of allowing only a communication device with a voluntary transmission right to initiate a frame exchange sequence and allowing a communication device without the voluntary transmission right to transmit only a frame which is a response to a received frame, the method comprising:
allowing a communication device to obtain the voluntary transmission right, the communication device having detected no frame transmission from any communication device over a communication network for longer than a first period;
to transfer the voluntary transmission right to another communication device, the communication device with the voluntary transmission right transmitting a voluntary transmission right transfer frame to the other communication device which is a transfer destination of the voluntary transmission right;
the other communication device receiving the voluntary transmission right transfer frame, transmitting an acknowledgement frame to the communication device which is a transmitting end of the voluntary transmission right transfer frame after a second period following the reception of the voluntary transmission right transfer frame; and
when having detected no frame transmission from any other communication device over the communication network in a third period after the transmission of the voluntary transmission right transfer frame, the communication device having transmitted the voluntary transmission right transfer frame, retransmitting the voluntary transmission right transfer frame in the first period after the transmission of the voluntary transmission right transfer frame,
wherein:
the first period, the second period, and the third period satisfy the following relation:
the first period>the third period>the second period.

35. The central management device according to claim 30, wherein:
the communication device as a transmitting station transmits the transmission right return frame without performing error-correction coding.

36. A communication device operating in a communication system in which a plurality of communication devices are connected by a communication network to the central management device for managing grant of a voluntary transmission right to the plurality of communication devices, the communication system providing a predetermined first period, a predetermined second period, and a predetermined third period, the predetermined first period being shorter than the predetermined third period, the central management device comprising:
a determination module for determining one of the communication devices has been granted the voluntary transmission right by the central management device; and
a receiver for receiving a transmission right return frame from the one of the communication devices determined as having been granted the voluntary transmission right to the central management device to voluntarily return the voluntary transmission right to the central management device,
wherein the central management device always returns an acknowledgement frame to the communication device in the predetermined first period after reception of the transmission right return frame from the communication device;
when the communication device having detected no frame transmission from any of the communication devices over a communication network for longer than the predetermined third period, the communication device being endowed with a right of obtaining the voluntary transmission right; and
the communication device with the voluntary transmission right, transmitting the transmission right return frame after the predetermined first period, which is shorter than the predetermined third period, following completion of transmission of last frame.

37. The central management device according to claim 36, wherein:
the communication device retransmits the transmission right return frame if the communication device does not receive the acknowledgement frame in response to the transmission right return frame in the predetermined second period, longer than the predetermined first period, after the transmission of the transmission right return frame.

38. The central management device according to claim 37, wherein:
when having detected no frame transmission from any of the communication devices over a communication network for longer than the predetermined third period, the communication device is endowed with a right of obtaining the voluntary transmission right; and
the communication device with the voluntary transmission right retransmits the transmission right return frame in the predetermined third period after last frame transmission or frame reception.

39. The central management device according to claim 36, wherein:
the central management device transmits to one of the communication devices a transmission right grant frame containing a transmission right grant duration indicating a grant duration of the voluntary transmission right, so as to grant the voluntary transmission right to the communication device; and
the central management device avoids voluntarily initiating frame transmission in a period of time from when the transmission of the transmission right grant frame is completed to when the transmission right grant duration expires, or in a period of time from when the acknowledgement frame is transmitted in response to the transmission right return frame to when the central management device detects no wireless signal transmission from any of the communication devices in a predetermined fourth period.

40. The central management device according to claim 36, wherein:
the central management device transmits the transmission right grant frame or data frame which needs to be transmitted to another communication device when the transmission right grant duration expires after transmission of a transmission right grant frame or when the central management device have detected no wireless signal transmission from any of the communication devices in a predetermined fourth period after the transmission of the acknowledgement frame in response to the transmission right return frame.

41. The central management device according to claim 39 or 40, wherein:
the central management device voluntarily initiates frame transmission in the predetermined third period after the transmission of the acknowledgement frame in response to the transmission right return frame.

42. The central management device according to claim 39 or 40, wherein:
if the communication device having transmitted the transmission right return frame cannot identify a type of a frame received immediately after the transmission of the transmission right return frame, or if the received frame is not the acknowledgement frame in response to the transmission right return frame having been transmitted previously, the communication device retransmits the transmission right return frame in a predetermined fifth period, shorter than the predetermined fourth period which is a period of time from when the received frame is received to when the central management device voluntarily initiates frame transmission.

* * * * *